US008867973B2

(12) United States Patent
Masui

(10) Patent No.: US 8,867,973 B2
(45) Date of Patent: Oct. 21, 2014

(54) IMAGE FORMING APPARATUS AND IMAGE FORMING METHOD THAT CORRECTS TEST PATTERN DATA AND IMAGE DATA BASED ON COLOR DISPLACEMENT AMOUNT

(75) Inventor: Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 13/818,726

(22) PCT Filed: Sep. 2, 2011

(86) PCT No.: PCT/JP2011/070543
§ 371 (c)(1),
(2), (4) Date: Feb. 25, 2013

(87) PCT Pub. No.: WO2012/036073
PCT Pub. Date: Mar. 22, 2012

(65) Prior Publication Data
US 2013/0148996 A1    Jun. 13, 2013

(30) Foreign Application Priority Data

Sep. 15, 2010  (JP) ................. 2010-206520
Nov. 30, 2010  (JP) ................. 2010-266091

(51) Int. Cl.
*G03G 15/01* (2006.01)
*G03G 15/00* (2006.01)
*H04N 1/50* (2006.01)

(52) U.S. Cl.
CPC ........ *G03G 15/0131* (2013.01); *G03G 15/0189* (2013.01); *G03G 15/5058* (2013.01); *H04N 1/506* (2013.01); *G03G 2215/0161* (2013.01)
USPC ................. 399/301; 399/49; 399/72

(58) Field of Classification Search
CPC .............. G03G 15/0131; G03G 15/5054; G03G 15/5058; G03G 2215/0161
USPC ......... 399/301, 49, 72; 347/116, 19; 430/43.1
See application file for complete search history.

(56) References Cited

U.S. PATENT DOCUMENTS 5,715,498 A      2/1998  Takeuchi et al. ................ 399/40
2005/0041990 A1*  2/2005  Sugiyama ....................... 399/49
(Continued)

FOREIGN PATENT DOCUMENTS

JP       08-085236      4/1996
JP       2004-101567    4/2004
(Continued)

OTHER PUBLICATIONS

International Search Report Issued Oct. 25, 2011 in PCT/JP2011/070543 Filed on Sep. 2, 2011.

(Continued)

*Primary Examiner* — Sophia S Chen
(74) *Attorney, Agent, or Firm* — IPUSA, PLLC

(57) ABSTRACT

An image forming apparatus includes an intermediate transfer body; a generating unit generating test pattern data; a storage unit storing a color displacement amount; a correcting unit correcting the test pattern data and image data based on the color displacement amount currently stored in the storage unit; a forming unit forming a test pattern based on the test pattern data corrected by the correcting unit on the intermediate transfer body at predetermined intervals, and forming an image based on the image data corrected by the correcting unit on the intermediate transfer body; a detecting unit detecting the test pattern formed on the intermediate transfer body; an updating unit determining an amount of change of the color displacement amount from a result of detection by the detecting unit, and updating the color displacement amount stored in the storage unit by using the amount of change of the color displacement amount.

15 Claims, 19 Drawing Sheets

(56) References Cited

U.S. PATENT DOCUMENTS

| | | | |
|---|---|---|---|
| 2005/0200689 A1 | 9/2005 | Shinohara et al. | 347/116 |
| 2005/0212887 A1 | 9/2005 | Tanaka et al. | 347/116 |
| 2006/0139433 A1* | 6/2006 | Yoshida | 347/116 |
| 2007/0188589 A1 | 8/2007 | Kusunose et al. | 347/238 |
| 2008/0174834 A1 | 7/2008 | Ueda et al. | |
| 2008/0273902 A1* | 11/2008 | Maeda | 399/301 |
| 2008/0279570 A1 | 11/2008 | Shinohara | 399/15 |
| 2009/0213399 A1* | 8/2009 | Ikeda | 358/1.9 |
| 2012/0038731 A1* | 2/2012 | Takahashi et al. | 347/116 |

FOREIGN PATENT DOCUMENTS

| | | |
|---|---|---|
| JP | 2004-294846 | 10/2004 |
| JP | 2005-274919 | 10/2005 |
| JP | 2005-292760 | 10/2005 |
| JP | 2006-044029 | 2/2006 |
| JP | 2006-091179 | 4/2006 |
| JP | 2007-047645 | 2/2007 |
| JP | 2007-219256 | 8/2007 |
| JP | 2008-129486 | 6/2008 |
| JP | 2008-203833 | 9/2008 |
| JP | 2008-287100 | 11/2008 |
| JP | 2010-078908 | 4/2010 |

OTHER PUBLICATIONS

Japanese Office Action dated Apr. 8, 2014, of JP application No. 2010-206520.

Japanese Office Action dated Jul. 18, 2014.

* cited by examiner

IMAGE FORMING APPARATUS AND IMAGE FORMING METHOD THAT CORRECTS TEST PATTERN DATA AND IMAGE DATA BASED ON COLOR DISPLACEMENT AMOUNT

TECHNICAL FIELD

The present invention relates to an image forming apparatus, particularly an image forming apparatus in which plural images having different colors are superposed upon one another in order to form an output image.

BACKGROUND ART

In color image forming apparatuses utilizing electrophotography technology, a tandem-type is the mainstream. In a color image forming apparatus of this type, plural image forming units are disposed in series in order to form a full-color image in a single path. Typically, images formed by the multiple image forming units corresponding to the colors of yellow, magenta, cyan, and black are transferred onto an intermediate transfer belt (intermediate transfer body) for a primary transfer. Then, the multiple images of the various colors on the intermediate transfer belt are transferred onto a recording sheet (recording medium) at once for a secondary transfer, forming an output image thereon. The output image is thereafter fused onto the recording sheet, thus forming a full-color image on the recording medium.

In such a tandem-type image forming apparatus, while improved productivity (number of recording sheets printed per unit time) may be significantly increased, color displacement (registration error) may be caused by positional errors between the various colors on the recording sheet. The positional errors may be caused by positional or size errors of the photosensitive drum in the image forming units or an exposing apparatus, or by an accuracy error of an optical system. Thus, color displacement control (registration control) is indispensable in order to correct such color displacement. In a color displacement control method, a test pattern is formed on the intermediate transfer belt for detecting color displacements among various colors. For example, the position of the test pattern is detected by a sensor, and the amount of color displacement, which may be referred to as a "registration error amount", is calculated from the detection result. Based on the calculated amount of color displacement, the optical path of various optical systems, image-write starting positions for various colors, or a pixel clock frequency may be corrected.

However, the color displacement control method according to the related art has the following problems.
(1) In order to correct the optical path of an optical system, the corrected optical system which may include a light source and an f-θ lens or mirrors and the like in the optical path need to be mechanically operated in order to align their positions with respect to the various colors. Such an operation requires highly accurate moving components, resulting in an increase in cost. Further, it takes a long time before the correction can be completed, and therefore the correcting operation cannot be performed very frequently.
(2) The amount of color displacement (registration error amount) may be changed over time due to deformation of the optical system or supporting members as a result of temperature changes in the apparatus, thus making it difficult to maintain the high image quality that is available immediately after the color displacement control.

In order to solve the problem (1), an image forming apparatus has been proposed whereby a registration error amount is determined based on the coordinates information of test patterns for various colors transferred onto the transfer belt and information about predetermined reference position coordinates of the test patterns. Based on the determined registration error amount, the output coordinates position of image data for each color is automatically converted into a corrected output coordinates position in which the registration error is corrected (see Patent Document 1). In another proposed image forming apparatus, in addition to image position correction with respect to the recording medium in a main scan direction and a sub-scan direction, at least one of image position correction amounts for the recording medium can be changed when forming the registration error detecting pattern and when forming an image. The image position correction amounts may include a magnification ratio and a partial magnification ratio in the main scan direction, a magnification ratio and a partial magnification ratio in the sub-scan direction, lead and side skews, and lead and side linearities (see Patent Document 2).

In order to solve the problem (2), an image forming apparatus is proposed in which the temperature in the apparatus is detected. When there is a certain amount of temperature change, color displacement control is performed. The color displacement control may be repeated after a passage of time.

However, in the technologies according to Patent Documents 1 and 2, although a high-quality image having little color displacement may be formed immediately after color displacement control, it is difficult to maintain the image quality at all times because the color displacement amount is changed over time. The same applies when the color displacement control includes detecting the temperature in the apparatus because the color displacement is not controlled at all times. Further, in the case of the technology involving the temperature detection, the color displacement amount is not directly detected, so that it is difficult to perform color displacement control accurately at appropriate timing in order to keep the displacement amount below a predetermined amount. As a result, the technology may lead to an excess or lack of frequency of color displacement control.

It also takes time to form the color displacement detecting test patterns, detect the test patterns, and calculate the error amount from the detection result. When the test patterns are formed, normal images cannot be printed, and, when the correction involves mechanical control, no printing can be performed until completion of correction when a stable operation can be obtained. Thus, if the color displacement control is performed frequently for maintaining high-quality image formation, productivity decreases.

Further, according to Patent Document 1 or 2, one routine of a color displacement control operation, which is based on information about the temperature changes in the apparatus, the passage of time, or the number of images that are successively formed, includes various processes. The processes include the test pattern formation, the detection of the color displacement amount with reference to the test patterns, and the calculation of the image position correction amount that is used until the next color displacement control based on the detected amount of color displacement. In this case, if a detection error or noise factor is produced in the detected value of color displacement amount, an erroneous image position correction amount is calculated. As a result, an image having color displacement is formed based the erroneous correction amount until the next color displacement control step is performed.

Such detection errors may be reduced by using highly accurate components with increased cost. Alternatively, plural sets of test patterns for color displacement detection may be formed, so that a color displacement amount can be calculated from an average value of multiple sets of detection values. However, in this case, the length of the test patterns may be increased, resulting in an increase in the period in which normal images cannot be printed. Thus, improvements in color displacement correction accuracy may be cancelled by a decrease in productivity.

During a continuous printing operation, the temperature within the apparatus may increase greatly, resulting in large changes in the amount of color displacement and therefore requiring frequent color displacement control. If the color displacement control is performed frequently, the down time in which no printing can be performed due to the test pattern formation and the error amount detection increases, leading to a decrease in productivity. It has been difficult to overcome the aforementioned problems of reduced productivity at the same time.

Namely, variations in color displacement amount may not be found quickly enough due to lack of frequency of color displacement control, or a high-quality image may not be formed due to erroneous correction caused by a detection error or noise. In order to overcome these problems, the frequency of color displacement control may be increased or the length of the test pattern may be increased for improving detection accuracy at the expense of productivity. These problems are particularly felt in printing machines of the electrophotography type, such as digital printing machines, in which high levels are desired for both quality and productivity at all times.

Color displacements in the output image may include not only a linear component that exhibits linear characteristics with respect to a distance in the main scan direction or the sub-scan direction, but also a non-linear component exhibiting non-linear characteristics with respect to such distance. For example, there is a non-linear color displacement referred to as a "scan bow" in the main scan direction as illustrated in FIG. 19(a), which may be caused by an accuracy error in an optical system. Depending on the optical system, a color displacement having curved characteristics with high-order (third-order or higher) components in the main scan direction may be formed, as illustrated in FIG. 19(b). Further, as a non-linear color displacement factor which is mainly caused by an accuracy error in an f-θ lens, a magnification ratio deviation may be caused in which partial magnification ratios of a main-scan magnification ratio of a formed image are varied when the scan speed on the photosensitive drum (image carrier) in the main scan direction is not constant (uniform), resulting in speed deviations on the drum depending on the position in the main scan direction. Such non-linear components of color displacement amounts cannot be corrected by the color displacement control methods according to the related art. Further, some types of color displacement may include a relatively large non-linear component. Thus, improvements in color displacement correction accuracy are desired when applying color displacement control according to the related art to an apparatus having a large non-linear color displacement.

Patent Document 1: Japanese Laid-open Patent Publication No. 8-85236

Patent Document 2: Japanese Laid-open Patent Publication No. 2005-274919

SUMMARY OF THE INVENTION

It is therefore an object of the present invention to provide an image forming apparatus capable of forming a high-quality image that is corrected for color displacement at all times without lowering productivity.

Another object of the present invention may be to provide an image forming apparatus capable of forming a high-quality output image which is accurately corrected not only for a linear component of color displacement but also a non-linear component of color displacement.

In one aspect of the present invention, an image forming apparatus includes an intermediate transfer body; a generating unit configured to generate test pattern data; a storage unit configured to store a color displacement amount; a correcting unit configured to correct the test pattern data and image data based on the color displacement amount currently stored in the storage unit; a forming unit configured to form a test pattern based on the test pattern data corrected by the correcting unit on the intermediate transfer body at predetermined intervals, and configured to form an image based on the image data corrected by the correcting unit on the intermediate transfer body; a detecting unit configured to detect the test pattern formed on the intermediate transfer body; and an updating unit configured to determine an amount of change of the color displacement amount from a result of detection by the detecting unit, and configured to update the color displacement amount stored in the storage unit by using the amount of change of the color displacement amount.

In another aspect of the present invention, an image forming method includes a correcting step of correcting test pattern data and image data generated by a generating unit, based on a color displacement amount currently stored in a storage unit; a forming step of forming a test pattern on an intermediate transfer body based on the test pattern data corrected in the correcting step at predetermined intervals, and forming an image on the intermediate transfer body based on the image data; a detecting step of detecting the test pattern formed on the intermediate transfer body; an updating step of determining an amount of change of the color displacement amount based on a result of detection in the detecting step, and updating the color displacement amount stored in the storage unit by using the amount of change of the color displacement amount.

In another aspect of the present invention, an image forming apparatus includes a storage unit configured to store color displacement amount characteristic data including a non-linear component in a main-scan direction for color displacement correction; a correcting unit configured to correct input image data and test pattern data based on the color displacement amount characteristic data stored in the storage unit; an output image forming unit configured to form a plurality of images of different colors based on the input image data corrected by the correcting unit, and configured to form an output image by superposing the plurality of images on an intermediate transfer body or a recording medium; a test pattern forming unit configured to form a plurality of test patterns on the intermediate transfer body or a transport member that retains and transports the recording medium, based on the test pattern data corrected by the correcting unit, the plurality of test patterns being disposed in the main-scan direction; a plurality of detecting units configured to detect the respective plurality of test patterns formed by the test pattern forming unit; and an updating unit configured to detect an amount of change of a color displacement amount at a detecting position of each of the plurality of transfer units based on results of detection by the plurality of detecting units, configured to calculate new color displacement amount characteristics data based on the amount of change of the color displacement amount and the color displacement amount characteristics data stored in the storage unit, and configured to update the color displacement amount characteristics data stored in the storage unit with the new color displacement amount characteristics data.

BEST MODE OF CARRYING OUT THE INVENTION

Description of Terms

An "image forming apparatus" may include a printer, a facsimile machine, a copy machine, a plotter, or a multifunction peripheral. A "recording medium" may include a medium of paper, thread, fiber, leather, metals, plastics, glass, wood, or ceramics. In the following, a recording medium may be referred to as a "sheet". Image formation refers to the process of imparting an image of a letter, a figure, a shape, or a pattern, for example, onto a recording medium or an intermediate transfer body. The intermediate transfer body may include an intermediate transfer belt.

A "main scan direction" and a "sub-scan direction" are defined as follows. When plural images are superposed upon one another on an intermediate transfer body, the "main scan direction" is a direction perpendicular to a direction of surface movement ("surface moving direction") of the intermediate transfer body, and the "sub-scan direction" is the surface moving direction of the intermediate transfer body. When plural images are superposed upon one another on a recording medium transported on a transport member, the "main scan direction" is a direction perpendicular to the surface moving direction of the transport member, and the "sub-scan direction" is the surface moving direction of the transport member. When a latent image is formed by scanning a surface of an image carrier (such as a photosensitive drum) moving in a predetermined direction with a light beam, the "main scan direction" and the "sub-scan direction" correspond to a scan direction of the light beam and the surface moving direction of the image carrier, respectively.

A "color displacement amount" refers to an amount of color displacement from a target color in various parts of an output image, which may be caused by a positional error between plural images that constitute the output image. The color displacement amount may include a "linear component" and a "non-linear component". The linear component is a color displacement amount component that exhibits linear characteristics with respect to a position (or distance) in a predetermined direction (such as the main scan direction or the sub-scan direction) at certain coordinates defined on the intermediate transfer body or the recording medium. The non-linear component refers to a color displacement amount component that exhibits non-linear characteristics with respect to the position (or distance) in the predetermined direction at certain coordinates on the intermediate transfer belt or recording medium. The "linear component" of the color displacement amount may include a constant component and a first-order component with respect to the distance. The "non-linear component" of the color displacement amount may include a higher-order (second-order or higher) component with respect to the distance.

(Structure of Main Parts)

Figure 1:
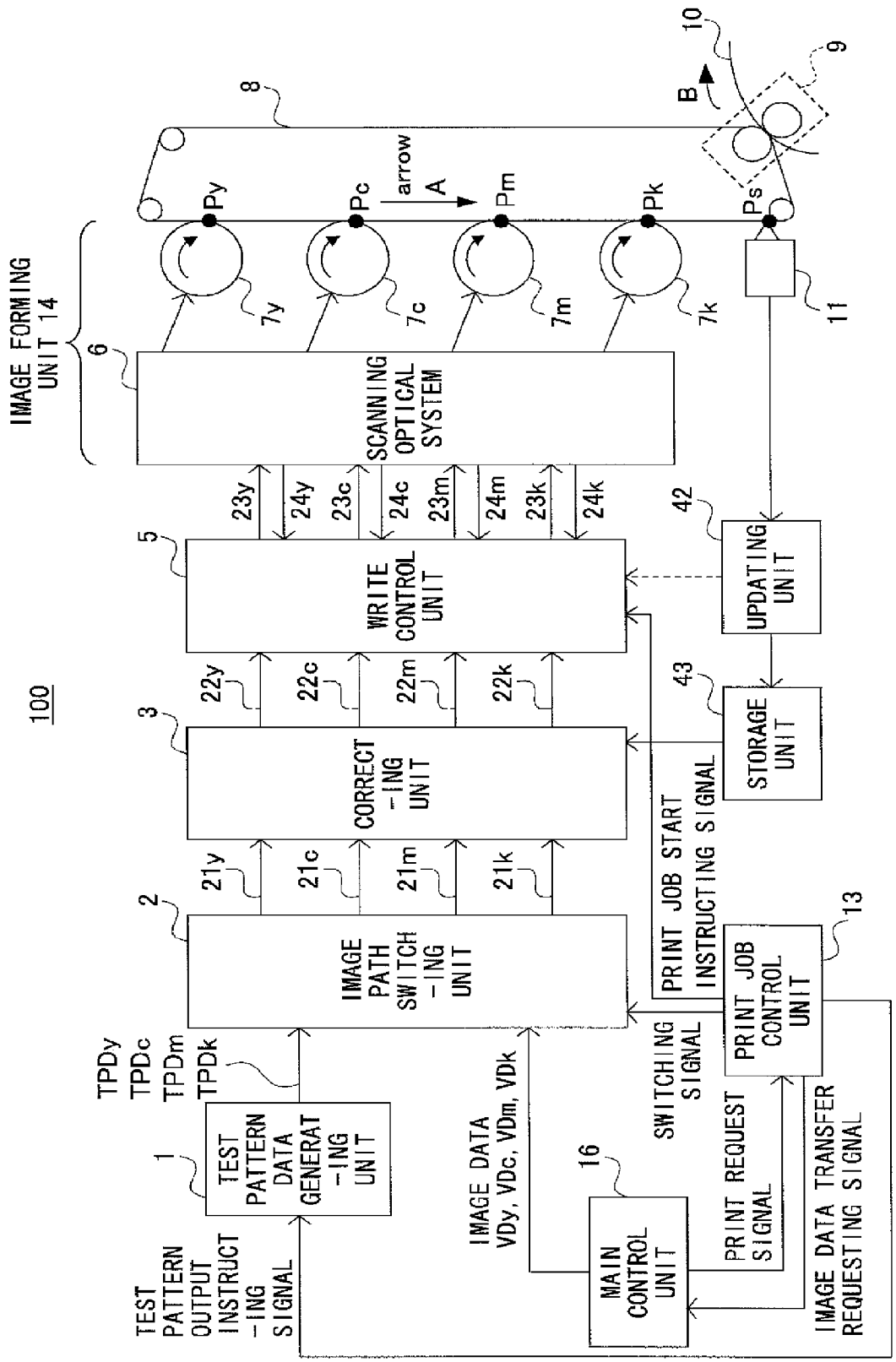
FIG. 1 is a block diagram of a functional configuration of an image forming apparatus according to an embodiment.

FIG. 1 is a block diagram of main portions of an image forming apparatus 100 according to an embodiment. The image forming apparatus 100 is of a tandem-type including image forming units for plural colors. The plural colors may include C (cyan), M (magenta), Y (yellow), and K (black), of which at least two colors may be used. Other colors may also be used. Preferably, five or more colors may be used. In the image forming apparatus 100 according to the present embodiment, an image and a test pattern are formed on an intermediate transfer belt 8 in a process described briefly below.

In the example of FIG. 1, the image forming apparatus 100 includes a generating unit 1, an image path switching unit 2, a correcting unit 3, a write control unit 5, a scanning optical system 6, image carriers (which may be referred to as "photosensitive bodies") 7K, 7M, 7C, 7Y for the corresponding colors C, M, Y, and K, an intermediate transfer belt 8, a secondary transfer unit 9, and a detecting unit 11. In the following, any of the photosensitive bodies 7K, 7M, 7C, and 7Y may be referred to as "the photosensitive body 7".

The various units illustrated in FIG. 1 are briefly described. The generating unit 1, upon reception of a pattern output instructing signal (to be described later) from a print job control unit 13, generates test pattern data TPDy, TPDc, TPDm, and TPDk for the colors Y, C, M, and K, respectively.

The test pattern data include the data as a basis for a test pattern. The test pattern is used for color displacement detection.

The image path switching unit 2 switches the outputs between image data VDy, VDc, VDm, and VDk for the colors Y, C, M, and K, respectively, and the test pattern data TPDy, TPDc, TPDm, and TPDk from the generating unit 1. The image data VDy, VDc, VDm, and VDk are transferred from a main control unit 16. In FIG. 1, the image data VDy, VDc, VDm, and VDk and the test pattern data TPDy, TPDc, TPDm, and TPDk are collectively designated by 21$y$, 21$c$, 21$m$, and 21$k$, respectively. The switching by the image path control unit 2 may be performed in accordance with a switch signal from the print job control unit 13.

The correcting unit 3, by using color displacement amounts stored in a storage unit 43, corrects the image data/test pattern data 21$y$, 21$c$, 21$m$, and 21$k$ output by the image path switching unit 2 such that the color displacement amount can be cancelled, and outputs corrected image data/test pattern data 22$y$, 22$c$, 22$m$, and 22$k$. The color displacement amount may be determined with reference to a head portion of the image data, and a sheet of recording medium (or a set of test patterns) may be corrected with the same color displacement amount. Such a correcting method is described later.

The storage unit 43 stores the current color displacement amount. The color displacement amount in the storage unit 43 is updated by an updating unit 42 as will be described later.

The write control unit 5 generates main-scan synchronization signals from line synchronization signals 24$y$, 24$c$, 24$m$, and 24$k$ for the respective colors. The line synchronization signals 24$y$, 24$c$, 24$m$, and 24$k$ are output from the scanning optical system 6 and indicate the timing of passage of a light beam for each color past a predetermined position. The main-scan synchronization signals indicate write-start positions for the colors in the main scan direction.

The write control unit 5 also generates sub-scan synchronization signals for the colors based on time differences between the various colors that are determined by the distances between the photosensitive bodies (such as between Py and Pc) and a linear speed V of the intermediate transfer belt 8, with respect to a print-job-start instructing signal that is input or a write start instruction from an engine controller unit (not illustrated). The sub-scan synchronization signals indicate write-start positions in the sub-scan direction. With reference to a pixel clock generated in the write control unit 5, and in synchronism with the main and sub-scan synchronization signals, the corrected image/test pattern data 22$y$, 22$c$, 22$m$, and 22$k$ for the respective colors are converted into write signals 23$y$, 23$c$, 23$m$, and 23$k$, respectively, which are modulating signals for the light sources in the scanning optical system 6. In this way, images are developed on the corresponding photosensitive bodies in accordance with the corrected image data of the respective colors, and the developed images are transferred onto the intermediate transfer belt 8 in a superposed manner.

The scanning optical system 6 is provided for the photosensitive body 7 of each of the respective colors. In the example of FIG. 1, the scanning optical systems for the multiple colors are collectively illustrated as the scanning optical system 6. The light sources in the scanning optical systems 6 scan the photosensitive bodies 7 with light beams in accordance with the corrected image/test pattern data 22$y$, 22$c$, 22$m$, and 22$k$ (converted into the respective write signals 23$y$, 23$c$, 23$m$, and 23$k$), thus forming an image (electrostatic latent image) or a test pattern on each of the photosensitive bodies 7. The latent images are developed by developing units (not illustrated). The images developed on the respective photosensitive bodies are transferred onto the intermediate transfer belt 8 in a superposed manner for primary transfer at primary transfer positions (or portions) Py, Pc, Pm, and Pk. After the primary transfer, the images of the various colors that have been transferred in a superposed manner are transferred onto a recording sheet 10 at once for secondary transfer by the secondary transfer unit 9. The transferred images are then fused onto the recording sheet 10 by a fusing unit (not illustrated), thereby forming a color image thereon. A timing control for the above operations may be performed by the main control unit 16 or the engine controller unit.

An image forming unit 14 includes the scanning optical system 6 and the photosensitive body 7. Namely, the image forming unit 14 forms an image and a test pattern based on the image data and test pattern data that are corrected by the correcting unit 3 on the intermediate transfer belt 8. A color displacement may be caused in the write control unit 5 or subsequent units.

The print job control unit 13 controls the timing of a print job. The "print job" may refer to a process of forming a single image or a set of test patterns on the intermediate transfer belt 8. The print job control unit 13 generates and outputs a print job start signal in response to an image print request. The print job control unit 13 may insert a print job for the test patterns between the print jobs for images at predetermined intervals (as will be described later), and generate and output a print job start instructing signal. The print job control unit 13 may generate an image data transfer request signal upon starting of a print job for the normal image, and a test pattern output instructing signal may be generated upon starting of a print job for the test patterns. The print job start instructing signal may be output to the engine controller unit and the write control unit 5, so that timing control for various units can be performed with reference to the print job start instructing signal. The engine controller unit (not illustrated) may be responsible for various controls for various units including the timing control.

(Print Job Timing)

Figure 2:
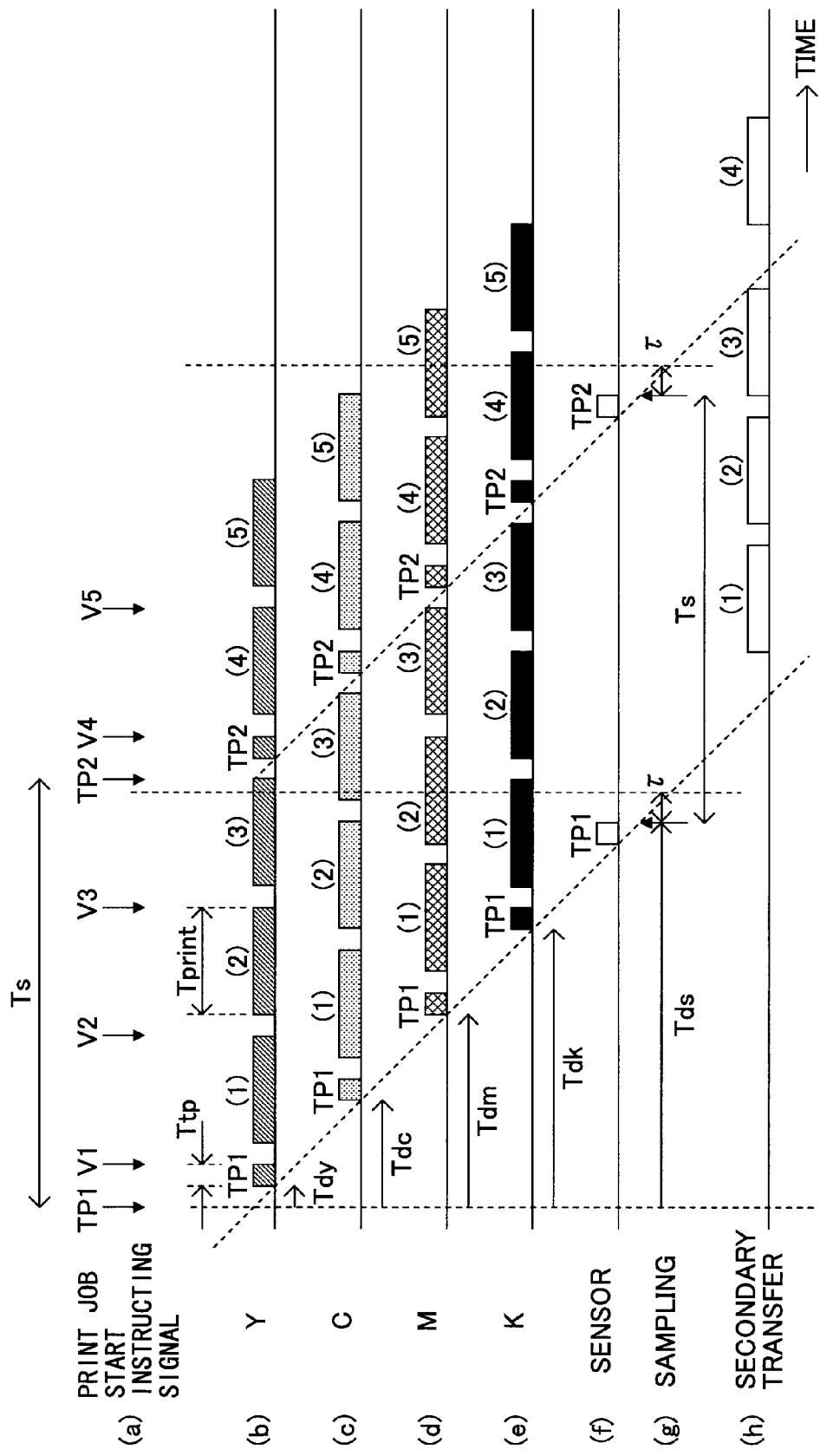
FIG. 2 illustrates the timing of print jobs performed by the image forming apparatus.

FIG. 2 is a timing chart illustrating an example of timing of print jobs. In the example of FIG. 2, one test pattern is formed outside image forming areas on the intermediate transfer belt 8 for every three output images formed in the image forming areas. In FIG. 2(*a*) through (*h*), the horizontal axis shows time.

FIG. 2(*a*) illustrates the timing of the print-job-start instructing signals. "TP1", "TP2", . . . with an arrow attached underneath indicate the start times of print jobs for the first, second, . . . , test patterns TP1, TP2, . . . , respectively. "V1", "V2", "V3", . . . with an arrow attached underneath indicate the start time of the print jobs for the first, the second, the third, . . . output images. Thus, the numbers suffixed to "V" indicate the serial numbers of the output images that are successively formed in a series of print jobs, i.e., the order of the recording sheets 10 on which output images are formed.

FIG. 2(*b*) through (*e*) illustrate the timing of primary transfer at the primary transfer positions Py, Pc, Pm, and Pk on the intermediate transfer belt 8. The numbers in the parentheses correspond to the numbers affixed to the start time "V" of the print jobs described with reference to the print-job-start instructing signal. For example, the images (1), (2), (3), . . . of yellow are transferred onto the intermediate transfer belt 8 for primary transfer by the print-job-start instructing signals V1, V2, V3, . . . , respectively.

FIG. 2(*b*) illustrates the timing of primary transfer of the yellow toner images (including the test patterns TP1, TP2, . . . and the images (1), (2), . . . ) developed on the photosensitive body 7$y$ onto the intermediate transfer belt 8 at the primary transfer position Py. The primary transfer for yellow is started upon elapsing of a predetermined delay time Tdy from the print-job-start instructing signal. Namely, the start times of primary transfer of the test pattern and the image for yellow each corresponds to the time at which the same delay time Tdy elapses from the corresponding print-job-start instructing signals. The delay time Tdy for yellow is the time required for performing control of the write control unit 5 and the process of forming a toner image on the photosensitive body 7$y$ by the image forming unit 14 after the output of the print-job-start instructing signal from the print job control unit 13 and before the start of primary transfer of the yellow test pattern and image.

Similarly, FIG. 2(*c*) illustrates the timing of primary transfer of the toner images for cyan (test pattern and images) developed on the photosensitive body 7*c* onto the intermediate transfer belt 8 at the primary transfer position Pc. The primary transfer for cyan is started upon elapsing of a predetermined delay time Tdc from the print-job-start instructing signal. The delay time Tdc for cyan corresponds to the delay time Tdy for yellow to which a time difference is added, the time difference being determined by the distance between the primary transfer positions Py and Pc and the linear speed V of the intermediate transfer belt 8. Namely, the delay time Tdc for cyan is determined by the following equation.

$$Tdc=Tdy+(Py-Pc)/V$$

where (Py−Pc) is the distance between the primary transfer positions Py and Pc, and V is the linear speed of the intermediate transfer belt 8.

The timing of writing the latent images on the photosensitive body 7*c* by the scanning optical system 6 and the timing of developing the latent images are controlled to correspond to the timing of primary transfer illustrated in FIG. 2(*c*) based on the delay time Tdc.

FIG. 2(*d*) illustrates the timing of primary transfer of the toner images (test pattern and images) of magenta developed on the photosensitive body 7*m* onto the intermediate transfer belt 8 at the primary transfer position Pm for magenta. The primary transfer is started upon elapsing of a predetermined delay time Tdm from the print-job-start instructing signal. The delay time Tdm for magenta corresponds to the delay time Tdy for yellow to which a time difference is added, the time difference being determined by the distance between the primary transfer positions Py and Pm and the linear speed V of the intermediate transfer belt 8. Namely, the delay time Tdm for magenta is determined by the following equation.

$$Tdm=Tdy+(Py-Pm)/V$$

where (Py−Pm) is the distance between the primary transfer positions Py and Pm.

The timing of writing of the latent images onto the photosensitive body 7*m* by the canning optical system 6 and the timing of developing the latent images are controlled to correspond to the primary transfer timing illustrated in FIG. 2(*d*) based on the delay time Tdm for magenta.

FIG. 2(*e*) illustrates the timing of primary transfer of the black toner images (test pattern and images) developed on the photosensitive body 7*k* for black onto the intermediate transfer belt 8 at the primary transfer position Pk. The primary transfer for black is started upon elapsing of a predetermined delay time Tdk from the print-job-start instructing signal. The delay time Tdk corresponds the yellow delay time Tdy to which a time difference is added, the time difference being determined by the distance between the primary transfer posi-tions Py and Pk, and the linear speed V of the intermediate transfer belt 8. Thus, the delay time Tdk is determined by the following equation.

$$Tdk=Tdy+(Py-Pk)/V$$

where (Py−Pk) is the distance between the primary transfer positions Py and Pk.

The timing of latent image writing on the photosensitive body 7*k* by the scanning optical system 6 and the timing of developing the latent images are controlled to correspond to the primary transfer timing illustrated in FIG. 2(*e*) based on the black delay time Tdk.

FIG. 2(*f*) illustrates the timing of passing of the test patterns TP1, TP2, . . . , at a detection point (detection position) Ps of the detecting unit (sensor) 11. Depending on the distance between the yellow primary transfer position Py and the detection point Ps, the time between the print job start time and the test pattern passing time is determined. Preferably, the operation of the detecting unit 11 may be terminated at times other than close to the test pattern passing timing, so that a detection error may be prevented and power consumption may be reduced. Such termination of operation of the detecting unit (sensor) 11 may be controlled by the main control unit 16 (or the engine controller unit).

FIG. 2(*g*) illustrates the times (upward arrows) at which the detection of the test pattern by the detecting unit (sensor) 11 is completed. The time of completion of the test pattern detection corresponds to a sampling point of a color displacement amount. A delay time Tds between the print job start time and the test pattern detection completion time (color displacement amount sampling point) corresponds to the yellow delay time Tdy to which a time difference is added, the time difference being determined by the sum of the distance between the primary transfer position Py and the sensor detection point Ps and the test pattern length, and the linear speed of the intermediate transfer belt 8. Namely, the delay time Tds is determined by the following equation.

$$Tds=Tdy+(Py-Ps+L)/V$$

where L is the length of the test pattern in the sub-scan direction, i.e., the direction of surface movement of the photosensitive body (i.e., the moving direction of the intermediate transfer belt 8) at the primary transfer position.

Upon elapsing of a time τ for calculating linear component data of the color displacement amount following the test pattern detection completion time (color displacement amount sampling point), the linear component data stored in the storage unit 43 is updated with the newly calculated linear component data. For print jobs issued after this update (i.e., TP2 and thereafter in the example of FIG. 2), the color displacement amount with the updated linear component data may be referenced for each color.

In FIG. 2(*g*), the sum of the delay time Tds and the time τ for color displacement amount updating, namely (Tds+τ), is the time for updating the color displacement amount after the start time of the test pattern print job. The time (Tds+τ) is a "waste time" for the control system configured to control the color displacement amount (linear component data and non-linear component data) stored in the storage unit 43 to correspond to the latest color displacement amount at all times. A test pattern print job interval Ts is a sampling period of the control system which is adjusted to be longer than the waste time according to the present embodiment. Because the variation in the color displacement amount as a control target is mainly due to temperature changes, the color displacement amount varies relatively slowly (or gradually) on the order (or intervals) of several minutes. The sampling period Ts only needs to be sufficiently smaller than such intervals, so that the sampling period Ts may be set to be on the order of several seconds. This means that a test pattern is inserted once every several sheets in the case of an apparatus capable of printing 60 sheets per minute. In an example of FIG. 3, one test pattern is inserted for every three sheets as will be described below. In this case, the sampling time accuracy may not be very strict.

FIG. 2(h) illustrates the timing of secondary transfer by the secondary transfer unit 9. The secondary transfer unit 9 transfers the output images on the intermediate transfer belt 8 onto the recording sheet 10 for secondary transfer. The test pattern formed on the intermediate transfer belt 8 is not transferred onto the recording sheet 10.

Figure 3:
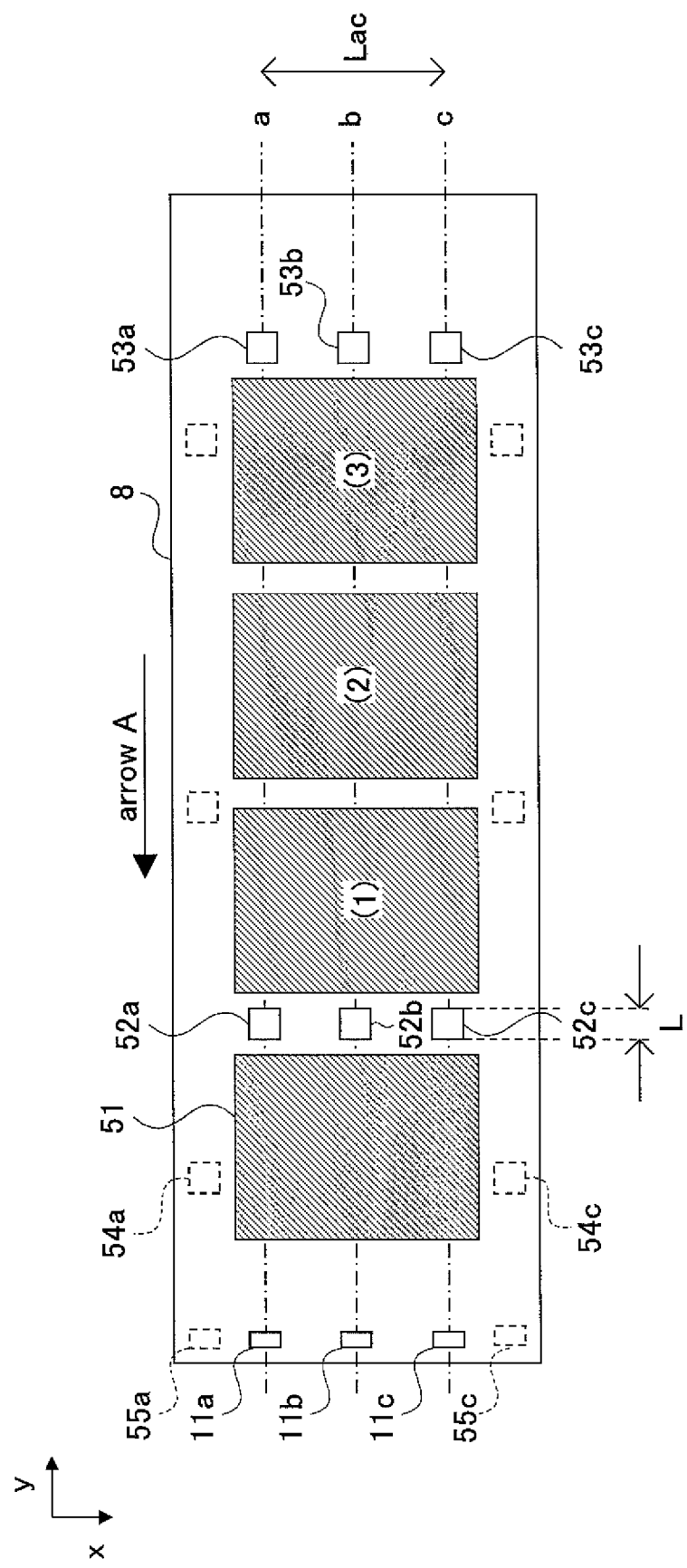
FIG. 3 is a plan view of an intermediate transfer belt of the image forming apparatus.

FIG. 3 is a plan view of the intermediate transfer belt 8 as seen from above in an orthogonal direction. FIG. 3 illustrates an example of positional relationships between areas where images and test patterns are formed on the intermediate transfer belt 8 and the detecting unit (sensor) 11. In FIG. 3, the direction in which the intermediate transfer belt 8 is moved (indicated by arrow A) corresponds to the sub-scan direction (y-axis direction). A direction perpendicular to the sub-scan direction corresponds to the main scan direction (x-axis direction). Thus, in the example of FIG. 3, the intermediate transfer belt 8 is moved in the negative direction along the Y axis.

In FIG. 3, hatched areas 51 are the regions (hereafter referred to as "image forming areas") where output images are formed by overlapping plural images of different colors. The numbers shown in parentheses in the image forming areas, i.e., (1), (2), and (3) correspond to the numbers (1), (2), and (3), respectively, described above with reference to FIG. 2. Thus, the numbers indicate the serial numbers of the image forming areas where images are successively formed on the intermediate transfer belt 8.

In the illustrated example of FIG. 3, three detecting units 11a, 11b, and 11c (sensors) are disposed in a row in the main scan direction. Test patterns are formed in regions (hereafter referred to as "test pattern forming areas") 52a, 52b, and 52c. The positions of the test pattern forming areas 52a, 52b, and 52c in the main scan direction correspond to (or are opposite to) the positions of the detecting units 11a, 11b, and 11c, respectively (on the dashed-dotted lines a, b, and c). The test pattern forming areas 52a, 52b, and 52c are set in a region ("sheet gap") between adjacent image forming areas 51 in the sub-scan direction. In this way, transfer of the test patterns onto the recording sheet 10 by the secondary transfer unit 9 can be prevented.

The test patterns may be formed at predetermined intervals, as will be described below.
(First Predetermined Intervals)

The predetermined intervals may include an interval of a predetermined number of images, as illustrated in FIG. 3. In this case, the test patterns are formed in areas between a predetermined number of images in the sub-scan direction, i.e., in the sheet gaps between the image forming areas 51 that are successively set in the surface moving direction of the intermediate transfer belt 8. In the example of FIG. 3, the predetermined number is three, so that a set of the test patterns is formed for every three images. Specifically, after a first set of test patterns 52a, 52b, and 52c are formed, a second set of test patterns 53a, 53b, and 53c are formed after a predetermined number (3) of images. Preferably, the interval may not precisely correspond to a certain distance, but instead the print jobs may be controlled such that the test patterns are inserted anywhere in the sheet gaps.

(Second Predetermined Intervals)

The predetermined intervals may include predetermined time intervals. In this case, the test patterns may be formed anywhere outside the image forming areas. For example, as indicated by broken lines in FIG. 3, the test patterns may be formed at positions 54a and 54c on both sides of the intermediate transfer belt 8 in the main scan direction. In this case, the detecting units 11 may be disposed at detection positions 55a and 55c corresponding to the positions 54a and 54c, respectively. When the test patterns are formed on both sides of the intermediate transfer belt 8 in the main scan direction, the need for providing a large interval (sheet gap) between the images may be eliminated, thus increasing productivity. Further, the need for disposing the test patterns exclusively with respect to the normal images in the sub-scan direction can be eliminated, so that the intervals at which the test patterns are formed in the moving direction of the intermediate transfer belt 8 can be freely selected.
(Third Predetermined Intervals)

The predetermined intervals may include both an interface of a predetermined number of images and a predetermined time interval. For example, when the images formed have different sizes, such as image sizes of A4, A3, A4, . . . , and so on, the test patterns may be formed at predetermined time intervals and at the intervals of a predetermined number of images.
(Configuration of Test Pattern)

Figure 4:
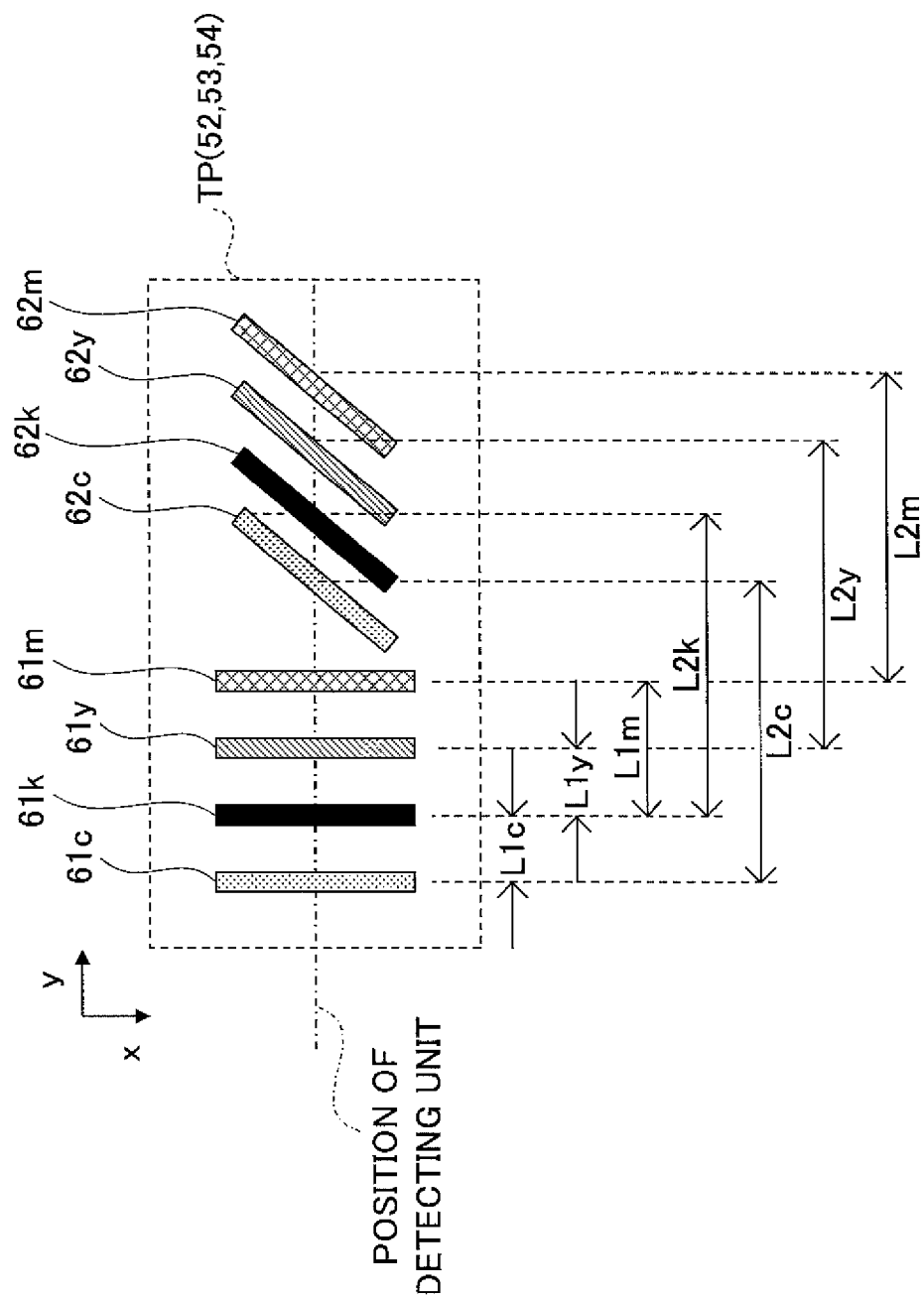
FIG. 4 illustrates a configuration of test patterns in the image forming apparatus.

FIG. 4 illustrates an example of a configuration of test patterns. In the example of FIG. 4, a test pattern TP includes straight line patterns 61c, 61k, 61y, and 61m for the various colors extending in a direction parallel to the main scan direction, and inclined line patterns 62c, 62k, 62y, and 62m for the various colors extending in a direction at an angle of 45° with respect to the main scan direction. The straight line patterns and the inclined line patterns are arranged in a predetermined color order (C, K, Y, and M in the illustrated example) in the sub-scan direction. Namely, the straight line patterns 61c, 61k, 61y, and 61m are followed by the inclined line patterns 62c, 62k, 62y, and 62m. A plurality of the test patterns TP are formed at multiple locations in the main scan direction (such as at the three locations 52a through 52c and 53a through 53c in the example of FIG. 3), thus forming a set of test patterns TP. The references "L1c", "L2k", and "L2c" will be described later.
(Structure of Detecting Unit)

Figure 5:
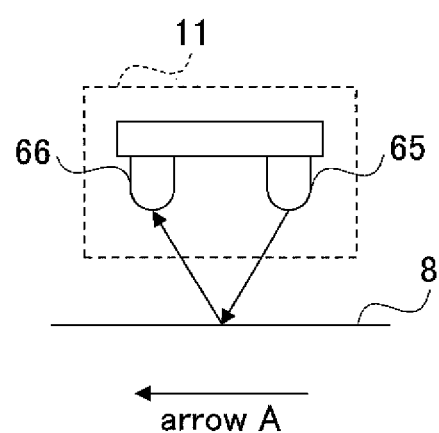
FIG. 5 illustrates a configuration of a detecting unit of the image forming apparatus.

FIG. 5 illustrates an example of a structure of the detecting unit (sensor) 11. The detecting unit 11 includes a pair of a light emitting portion 65 and a light receiving portion 66. The light emitting portion 65 irradiates the intermediate transfer belt 8 with light as the intermediate transfer belt 8 is moved in a direction indicated by an arrow A. The light receiving portion 66 receives reflection light reflected by the intermediate transfer belt 8 and converts the reflection light into an electric signal. When no test pattern is formed on the intermediate transfer belt 8 (i.e., when there is no toner), the amount of reflection light is high. When a test pattern is formed (i.e., when there is toner), the amount of reflection light received by the light receiving portion 66 is reduced because the illuminating light is scattered. Thus, the presence or absence of the test patterns can be detected. A threshold value for the reflection light amount may be determined in advance. In this case, the detecting unit 11 may determine that no test pattern is formed when the reflection light amount is greater than the threshold value. The detecting unit 11 may determine that a test pattern is formed when the reflection light amount is less than the threshold value. In this way, the detecting unit 11 can detect the presence or absence of the test patterns.

The electric signal output from the light receiving portion 66 of the detecting unit 11 may be converted into a digital signal by an A/D converter in the updating unit 42 (see FIG. 1). The digital signal may then be processed by a signal processing unit in the updating unit 42 in order to determine the time at which the center of each of the test patterns 61 and 62 has passed a detection position of the detecting unit 11. Based on the time at which the test patterns 61 and 62 have passed and the linear speed of the intermediate transfer belt 8, the distance between the test patterns can be measured. For example, the distances L1c, L1y, and L1m between the straight line pattern 61k for the reference color K and the straight line patterns 61c, 61y, and 61m for the other colors can be measured. Also, the distances L2c, L2y, L2m, and L2k (suffix indicating the color) between the straight line pattern 61 and the inclined line pattern 62 for the same color can be measured (see FIG. 4).

Embodiment 1

In Embodiment 1, constituent elements of the color displacement amount may include at least one of a skew error "d", a main-scan-direction magnification ratio error "a", a main-scan-direction registration error "c", and a sub-scan-direction registration error "f", where "d", "a", "c", and "f" are real numbers. The constituent elements of the color displacement amount may also include other elements. "Displacement" herein refers to an error. The "color displacement amount" in the following description may include all of the skew error d, the main-scan-direction magnification ratio error a, the main-scan-direction registration error c, and the sub-scan-direction registration error f.

The "skew error" refers to an error that is caused when an image or a test pattern formed on the intermediate transfer belt 8 has a predetermined inclination. The "main-scan-direction magnification ratio error" refers to an error caused in the main scan direction when an image magnification ratio is changed. The "main-scan-direction registration error" refers to an error in a direction parallel to the main scan direction with respect to an ideal scan line. The "sub-scan-direction registration error" refers to an error in a direction parallel to the sub-scan direction with respect to an ideal scan line.

Regarding the main-scan-direction magnification ratio error, an overall magnification ratio in the main scan direction is expressed by a'=1+a. Thus, in the following description, "a'", "c", "d", and "f" are referred to as the constituent elements of the color displacement amount. The values of a', c, d, and f, when updated a number N (N being a natural number) of times, are referred to as "a'$_N$", "c$_N$", "d$_N$", and "f$_N$", respectively.

Figure 6:
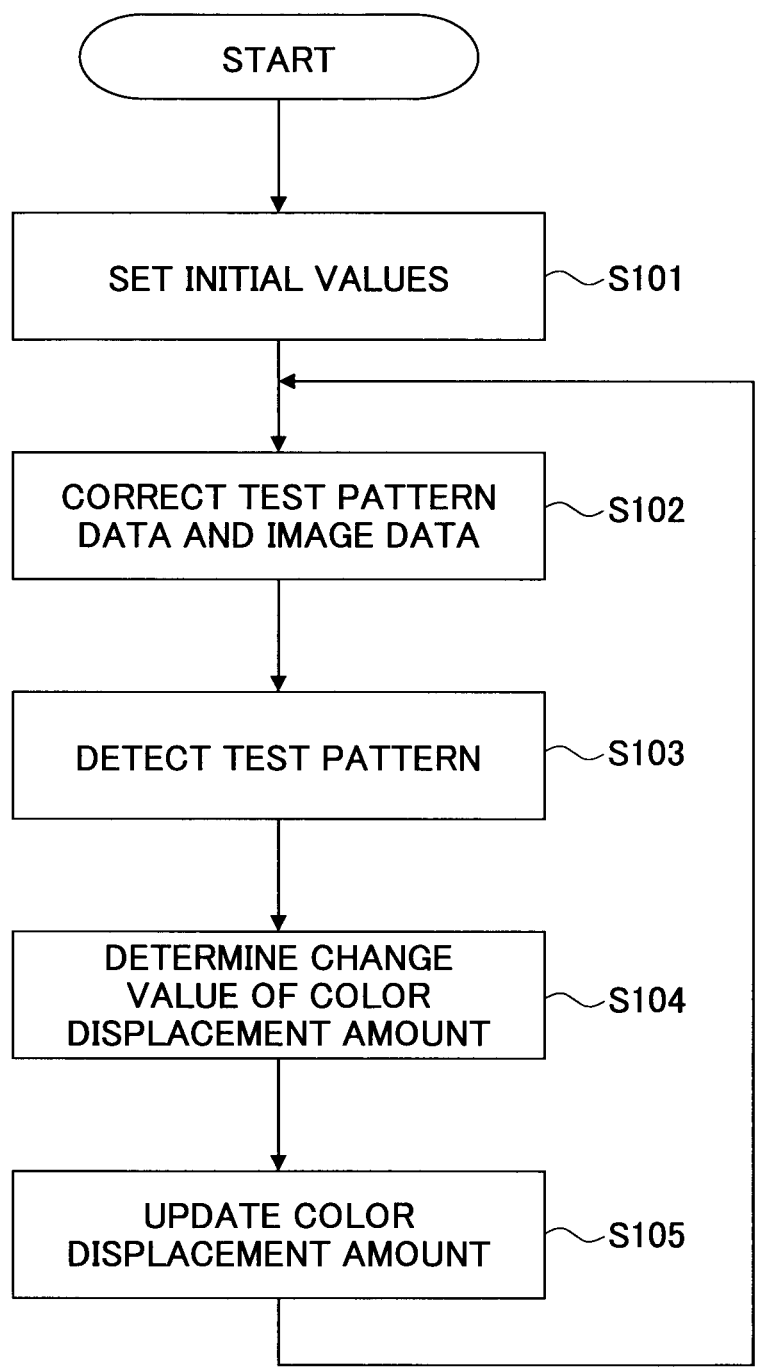
FIG. 6 is a flowchart of a process performed by the image forming apparatus.

FIG. 6 is a flowchart of a process performed by the image forming apparatus 100 according to Embodiment 1. The flow illustrated in FIG. 6 is performed for each of the various colors (C, M, Y, and K).

<Step S101>

In step S101, initial values a'$_0$, c$_0$, d$_0$, and f$_0$ of the color displacement amount are set and stored in the storage unit 43 (see FIG. 1). The initial values may be set by various methods. For example, the initial values may be set such that a'$_0$=1, c$_0$=0, d$_0$=0, and f$_0$=0 assuming there is no color displacement amount. Alternatively, the color displacement amount used previously may be stored in the storage unit 43 as the initial values. Preferably, a test pattern may be formed without correcting the color displacement amount, and the color displacement amount may be calculated based on a result of detection of the test pattern in a color displacement amount initial value detecting step as described above, and the calculated amounts may be set as the initial values. Correction of the color displacement amount will be described later. The color displacement amount initial value detecting step may include averaging results detected by forming plural sets of test patterns so that errors can be smoothed.

<Step S102>

In step S102, the correcting unit 3 corrects the image data/test pattern data based on the color displacement amount of the current time stored in the storage unit 4. The relationship between the correction by the correcting unit 3 and the color displacement amount is described.

The image data VD and the test pattern data TPD input into the correcting unit 3 are expressed by coordinates (x, y), for example. Image data VD' and test pattern data TPD' that have been corrected by the correcting unit 3 are expressed by coordinates (x', y'), for example. An image and a test pattern formed on the intermediate transfer belt 8 are expressed by coordinates (x", y"), for example. "x", "x'", and "x"" are coordinates in the main scan direction, while "y", "y'", and "y"" are coordinates in the sub-scan direction.

Thus, the relationship between (x', y') and (x", y") can be expressed by the following equation (1).

$$x''=a'x'+0y+c$$
$$y''=dx'+1y+f \quad (1)$$

Equation (1) may be expressed by the following equation (2) by using a matrix.

$$\begin{pmatrix} x'' \\ y'' \end{pmatrix} = \begin{pmatrix} a' & 0 \\ d & 1 \end{pmatrix}\begin{pmatrix} x' \\ y' \end{pmatrix} + \begin{pmatrix} c \\ f \end{pmatrix} \quad (2)$$

Equation (2) may be modified as follows.

$$\begin{pmatrix} x'' \\ y'' \\ 1 \end{pmatrix} = A \cdot \begin{pmatrix} x' \\ y' \\ 1 \end{pmatrix} \quad (3)$$

where $$A = \begin{pmatrix} a' & 0 & c \\ d & 1 & f \\ 0 & 0 & 1 \end{pmatrix}$$

In equation (3), multiplying the matrix A means the presence (or causing) of a color displacement. In the following, the matrix A may be referred to as a "color displacement transform matrix". The above equations (1) through (3) are valid for each of the various colors.

Thus, the correcting unit 3 corrects the coordinates (x, y) by using an inverted matrix $A^{-1}$ of the color displacement transform matrix A, as indicated by equation (4). The inverted matrix $A^{-1}$ may be referred to as a "correcting matrix".

$$\begin{pmatrix} x' \\ y' \\ 1 \end{pmatrix} = A^{-1} \cdot \begin{pmatrix} x \\ y \\ 1 \end{pmatrix} \quad (4)$$

By the correction performed by the correcting unit 3 according to equation (4), the color displacement transform matrix A can be cancelled as indicated by the following equation (5). Namely, the color displacement amount of the image on the intermediate transfer belt 8 can be corrected (thus eliminating the color displacement).

$$\begin{pmatrix} x'' \\ y'' \\ 1 \end{pmatrix} = A \cdot A^{-1} \cdot \begin{pmatrix} x \\ y \\ 1 \end{pmatrix} \quad (5)$$

Thus, $$\begin{pmatrix} x'' \\ y'' \\ 1 \end{pmatrix} = \begin{pmatrix} x \\ y \\ 1 \end{pmatrix}$$

Thus, the correcting unit 3 corrects the image data VD and the test pattern data TPD by using the inverted matrix $A^{-1}$ of the matrix A having the components a', c, d, and f as the elements of the color displacement amount. Based on the corrected test pattern data and image data, the image forming unit 14 (scanning optical system 6 and photosensitive body 7) forms a test pattern and an image on the intermediate transfer belt 8.

<Step S103>

In step S103, the detecting unit 11 detects the test pattern TP (refer to the description of FIG. 5). Then, the updating unit 42 samples an output signal from the detecting unit 11 in accordance with the print job start instructing signal described with reference to FIG. 2. The process stands by in step S103 until the timing of the print job start instructing signal. Then, the updating unit 42 may determine the distances between adjacent test patterns (see FIG. 4).

<Step S104>

In step S104, the updating unit 42 determines an amount of change in the color displacement amount. When the amount of change of the color displacement amount is calculated for the first time, the amount of change $\Delta a'_1$, $\Delta c_1$, $\Delta d_1$, and $\Delta f_1$ is determined from the initial values $a'_0$, $c_0$, $d_0$, and $f_0$ of the color displacement amount. The N-th amount of change (i.e., the amount of change determined by using the N-th test pattern) is designated as $\Delta a'_N$, $\Delta c_N$, $\Delta d_N$, and $\Delta f_N$.

Next, a method of determining the amount of change of the color displacement amount is described. In the following example, the amount of change of the color displacement amount of each of the colors (C, M, Y) is calculated with respect to black (K), where the patterns are arranged as illustrated in FIG. 4. A measured distance between the straight line pattern 61k of the reference color K and the straight line pattern of a target color, such as the straight line pattern 61c for C, is L1c. Similarly, measured distances for M and Y with respect to the reference color K are referred to as L1m and L1y, respectively (not illustrated). A measured distance between the straight line pattern 61 and the inclined line pattern 62 of the corresponding colors is L2, with the suffix indicating its color. For example, in the case of cyan, the measured distance is L2c. In the case of black, the measured distance is L2k. The unit of the distance may be millimeters.

An ideal distance (i.e., the distance between the patterns as output from the test pattern generating unit 1) between the straight line pattern 61k of the reference color K and the straight line pattern 61c for C is L1ref. The distance between the straight line patterns of K and Y is the same L1ref. The distance between the straight line patterns of K and M is twice as long, or 2L1ref.

The distances measured by the detecting units 11a, 11b, and 11c are differentiated by putting suffixes "_a", "_b", or "_c". For example, the distance between the straight line patterns 61c and 61k detected by the detecting unit 11a is L1c_a. The distance between the straight line pattern 61k and the inclined line pattern 62k detected by the detecting unit 11a is L2k_a. The distance between the detecting units 11a and 11c is Lac. By using such distances, the various components of the color displacement amount can be calculated as follows.

(Skew Error)

The amounts of change $\Delta d(C)$, $\Delta d(M)$, and $\Delta d(Y)$ of the skew errors d(C), d(M), and d(Y), respectively, of the various colors (C, M, and Y) with respect to black (K) can be expressed by the following equations. These equations are collectively referred to as equation 6. The distance between the detecting units 11a and 11c Lac is determined in advance.

$$\Delta d(C) = (L1c\_c - L1c\_a)/Lac$$

$$\Delta d(M) = (L1m\_c - L1m\_a)/Lac$$

$$\Delta d(Y) = (L1y\_c - L1y\_a)/Lac \quad (6)$$

(Sub-Scan-Direction Registration Error)

The amounts of change $\Delta f(C)$, $\Delta f(M)$, and $\Delta f(Y)$ of the registration errors f(C), f(M), and f(Y), respectively, of the various colors (C, M, Y) with respect to black (K) in the sub-scan direction are expressed by the following equations, which are collectively referred to as equation 7.

$$\Delta f(C) = ((0.25 \cdot L1c\_a + 0.5 \cdot L1c\_b + 0.25 \cdot L1c\_c) - L1\text{ref}) \cdot \kappa$$

$$\Delta f(M) = ((0.25 \cdot L1m\_a + 0.5 \cdot L1m\_b + 0.25 \cdot L1m\_c) - 2 \cdot L1\text{ref}) \cdot \kappa$$

$$\Delta f(Y) = ((0.25 \cdot L1y\_a + 0.5 \cdot L1y\_b + 0.25 \cdot L1y\_c) - L1\text{ref}) \cdot \kappa \quad (7)$$

where κ is a coefficient for converting the unit of distance from [mm] to [dots]. For example, for 1200 dpi of image data, κ=1200/25.4.

(Main-Scan-Direction Magnification Ratio Error)

The amounts of change $\Delta a(C)$, $\Delta a(M)$, and $\Delta a(Y)$ of the magnification ratio errors a(C), a(M), and a(Y), respectively, of the various colors (C, M, Y) with respect to black (K) in the main scan direction are expressed by the following equations, which are collectively referred to as equation (8).

$$\Delta a(C) = ((L2c\_c - L2k\_c) - (L2c\_a - L2k\_a))/Lac$$

$$\Delta a(M) = ((L2m\_c - L2k\_c) - (L2m\_a - L2k\_a))/Lac$$

$$\Delta a(Y) = ((L2y\_c - L2k\_c) - (L2y\_a - L2k\_a))/Lac \quad (8)$$

(Main-Scan-Direction Registration Error)

The amounts of change $\Delta c(C)$, $\Delta c(M)$, and $\Delta c(Y)$ of the registration errors c(C), c(M), and c(Y), respectively, of the various colors (C, M, Y) with respect to black (K) in the main scan direction are expressed by the following equations, which are collectively referred to as equation (9).

$$\Delta c(C) = ((L2c\_a - L2k\_a) - Lbd \cdot a(C)) \cdot \kappa$$

$$\Delta c(M) = ((L2m\_a - L2k\_a) - Lbd \cdot a(M)) \cdot \kappa$$

$$\Delta c(Y) = ((L2y\_a - L2k\_a) - Lbd \cdot a(Y)) \cdot \kappa \quad (9)$$

"Lbd" in equation (9) is described. In the scanning optical system 6 in FIG. 1, a synchronization detecting sensor is provided for each of the colors. The synchronization detecting sensors generate the line synchronization signals 24y, 24c, 24m, and 24k upon passage of a light beam. "Lbd" indicates the distance between the synchronization detecting sensor and the detecting unit 11a and is determined in advance. The term "Lbd·a(C)" is a term for subtracting a position error caused by a magnification ratio error in the main scan direction from a registration error during a scan period between the synchronization detecting sensor as a synchronization position in the main scan direction and the detecting unit 11a for calibration purposes.

When the test pattern is formed at the position 54 (see FIG. 3), equation (7) may be modified to the following equation (7') as regards the registration error in the sub-scan direction. The other error components (skew error, main-scan-direction magnification ratio error, and main-scan-direction registration error) may be determined by the same equation.

$$f(C)=f(M)=f(Y)=((0.5 \cdot L1c\_a+0.5 \cdot L1c\_c)-L1ref) \cdot \kappa \quad (7')$$

Of the values used in equations (6), (7), (7'), (8), and (9), the values other than the predetermined values (such as Lac) may be collectively referred to as an "update requiring value". The update requiring value is a value that is not determined in advance, such as $L1c\_c$. A method of calculating the update requiring value is described with reference to $L1c\_c$, for example.

The detecting unit 11c determines a time "s" which is a difference between the time at which the straight line pattern 61c is detected and the time at which the straight line pattern 61k is detected. The updating unit 12 then multiplies the linear speed V of the intermediate transfer belt 8 with the time s in order to calculate $L1c\_c$. The other values may be calculated in a similar manner. Thus, all of the update requiring values are calculated in step S103.

When the test patterns are configured differently from FIG. 4, the method of calculating the amount of change of the color displacement amount may be modified as required.

<Step S105>

In step S105, the updating unit 12 updates the most recent color displacement amount stored in the storage unit 4 by using the amount of change calculated in step S104. The color displacement amount may be updated by various methods. In the following, three methods are described. While the following description involves the updating of only the main-scan-direction magnification ratio error "a" of the various constituent elements of the color displacement amount, the same equations may be used for updating the other constituent elements, i.e., the skew error "d", the main-scan-direction registration error "c", and the sub-scan-direction registration error "f". Updating of the color displacement amount is performed for all of the various colors C, M, Y, and K.

(First Updating Method)

In a first updating method, as expressed by the following equation (10), the currently calculated amount of change of the color displacement amount is added to the most recent (i.e., previous) color displacement amount stored in the storage unit 4 in order to update the color displacement amount.

$$a_n = a_{n-1} + \Delta a_n \quad (10)$$

where $a_n$ and $a_{n-1}$ are magnification ratio errors of the color displacement amount in the main scan direction determined by the n-th and n−1th updates, respectively. "$\Delta a_n$" is the amount of change of the magnification ratio error of the color displacement amount in the scan direction determined for the N-th time. Because the current update is the first update (n=1), the initial value $a_0$ is updated by the following equation (10'), thus calculating $a_1$.

$$a_1 = a_0 \Delta a_1 \quad (10')$$

(Second Method)

The color displacement amount calculated from a set of test patterns may include an error at the time of forming the test patterns, or a reading error of the sensor. Thus, when the initial value $a_0$ and the amount of change $\Delta a_1$ of the color displacement amount are simply added as according to equation (10), the calculated color displacement amount may be varied by the influence of the error at the time of test pattern formation or the reading error of the sensor (which may be hereafter referred to as "noise"). In order to limit the noise, a product of the change value of the color displacement amount and a predetermined coefficient Kp may be added in order to calculate the new color displacement amount $a_n$, as expressed by equation (11). By the calculation according to equation (11), the noise component can be smoothed, so that the color displacement amount can be determined highly accuracy. Kp is a proportional gain coefficient and a predetermined constant.

$$a_n = a_{n-1} + Kp \cdot \Delta a_n \quad (11)$$

When the current update is the first update, the initial value $a_0$ is updated according to the following equation (11'), thus calculating $a_1$.

$$a_1 = a_0 + Kp \cdot \Delta a_1 \quad (11')$$

By updating according to equation (11) or (11'), the noise component can be smoothed, so that the color displacement amount can be updated highly accurately.

(Third Updating Method)

In a third updating method, in order to update the color displacement amount, the updating unit 42 determines a sum of a product of the currently determined change amount and the predetermined first coefficient Kp, a product of the currently determined change amount and a predetermined second coefficient Ki, and the most recent color displacement amount stored in the storage unit 4, as expressed by equation (12). Thus, the color displacement amount is updated by a so-called "PI control".

$$a_n = a_{n-1} + Kp \cdot \Delta a_n + Ki \cdot \sum_{s=1}^{n} \Delta a_s \quad (12)$$

When the current update is the first update, the initial value $a_0$ is updated according to the following equation (12'), thus calculating $a_1$.

$$a_1 = a_0 + Kp \cdot \Delta a_1 + Ki \cdot \Delta a_1 \quad (12')$$

where Kp is a proportional gain coefficient, and Ki is an integrated gain coefficient which is determined in advance. The gain coefficients Kp and Ki determine a control band by which a high-frequency component noise is limited. Thus, by using the third updating method, plural sets of test patterns need not be formed. Further, the need for calculating an average value of the amounts of change of the color displacement amount from plural test patterns can be eliminated, and the color displacement amount can be calculated with sufficient accuracy by using only one set of short test patterns. Because an integrated value of the amount of change $\Delta a_n$ of the color displacement amount is also reflected, a steady error can be reduced.

The control band may be determined such that the color displacement amount can be determined by tracking changes such as gradual changes due to temperature changes. Thus, when the sampling period is on the order of several seconds, the control band may be set to be smaller than the sampling period by a factor of several tens or several hundreds by adjusting the first coefficient Kp and the second coefficient Ki.

Preferably, the first coefficient Kp and the second coefficient Ki may be varied depending on the calculation of the various components of the color displacement amount. For example, when the required control band differs from one element to another among the elements a, c, d, and f (such as when a particular element is sensitive to temperature changes), Kp and Ki may be varied only for the particular element. Preferably, Kp and Ki may be varied for the various elements so that their control bands can be different from each other. In this way, interference among the elements can be prevented during the process of updating the color displacement amount of the elements, so that the color displacement amount can be updated more accurately.

Preferably, an updating method other than the first through third updating methods may be used. The updating unit 42 then updates the most recent color displacement amount stored in the storage unit 4 with the calculated color displacement amount.

(Second and Subsequent Updating Processes)

<Step S102>

Referring to FIG. 6, after the first updating process in step S105 is completed, the process returns to step S102. Then, the correcting unit 3 corrects the input image data and test pattern data according to equation (4) based on the updated color displacement amount (color displacement amount of the present time). For the elements a', c, d, and f of the correcting matrix $A^{-1}$, the values updated in step S105 are used. The image forming unit 14 then forms an image and a test pattern on the intermediate transfer belt 8 based on the corrected image data and test pattern.

In step S103, the test pattern formed on the intermediate transfer belt 8 is again detected.

In step S104, the amount of change of the color displacement amount is determined according to equations (6), (7) (or (7')), (8), and (9) by using the update requiring value (such as L1c_c) determined in step S103.

In step S105, the updating unit 12 updates the color displacement amount stored in the storage unit 4 by using the most recently determined amount of change of the color displacement amount according to any of the update equations (10) through (12), or another update equation. Then, the routine returns to step S102 and the process is repeated.

Thus, in accordance with Embodiment 1, the image forming unit 14 of the image forming apparatus 100 forms test patterns at predetermined intervals (outside the image forming areas) such that the formation of an image is not prevented. Thus, the periods (intervals) of test pattern formation can be decreased in order to increase the accuracy of updating the color displacement amount without an associated decrease in productivity. Further, the color displacement correction can be performed without mechanical corrections which take time before a stable operation is possible. Thus, no downtime is caused by test pattern formation, detection of color displacement amount, or mechanical correction, thus preventing the decrease in productivity.

Further, in the image forming apparatus 100 according to Embodiment 1, the correcting unit 3 corrects the test pattern data and image data in step S102 of FIG. 6. The detecting unit 11 then determines an update requiring value by detecting the test pattern which is based on the test pattern data most recently corrected by the correcting unit 3. Then, in step S104, the updating unit 42 determines the amount of change of the color displacement amount from the determined update requiring value, and updates the color displacement amount stored in the storage unit 4. Thus, a feedback control of the color displacement amount can be performed. Thus, in the image forming apparatus 100 according to the present embodiment, the color displacement amount can be updated while reducing the steady error in color displacement amount. As a result, the color displacement amount can be updated by adapting to changes such as temperature changes in the image forming apparatus as needed. Thus, the color displacement amount can be update accurately.

Embodiment 2

Figure 7:
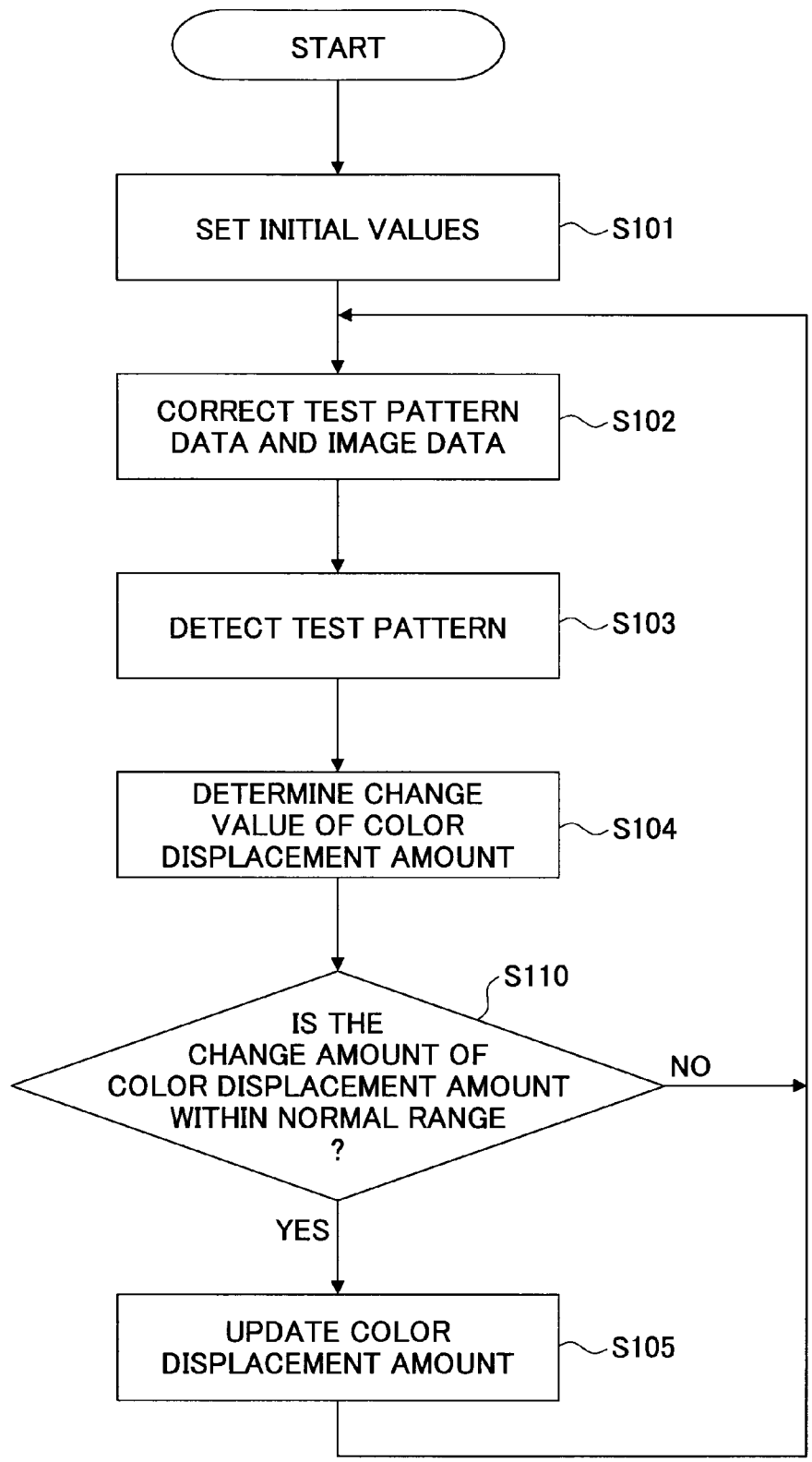
FIG. 7 is a flowchart of a process performed by the image forming apparatus according to another embodiment.

Next, the image forming apparatus 100 according to Embodiment 2 is described with reference to a flowchart of FIG. 7. The flow of FIG. 7 differs from the flow of FIG. 6 in that step S110 is provided between steps S104 and S105. In the following, the flow of FIG. 7 is described by focusing mainly on step S110.

In step S104, the amount of change of the color displacement amount is determined. In step S110, the updating unit 12 determines whether the amount of change $\Delta a_n$, $\Delta c_n$, $\Delta d_n$, $\Delta f_n$ (n=1, . . . , N) of the color displacement amount is within a predetermined range (normal range). When the updating unit 12 determines that the amount of change of the color displacement amount is within the normal range ("Yes" in step S110), the process proceeds to step S105. The normal range may be experimentally determined in advance.

If the updating unit 12 determines that the amount of change of the color displacement amount is not within the normal range ("No" in step S110), the routine returns to step S102 without performing the process of updating the color displacement amount by the updating unit 12. When the amount of change of the color displacement amount is not within the normal range, the updating unit 12 may determine that there is an error in the detection of the test pattern by the detecting unit 11. In the following, the amount of change of the color displacement amount may be said to have a "normal value" when the amount of change is within the normal range. The amount of change of the color displacement amount may be said to have an "abnormal value" when not within the normal range.

The amount of change of the color displacement may be determined to be not within the normal range in the following case. For example, when there is a scratch on the intermediate transfer belt 8, the detecting unit 11 may detect the scratch and output a detection result corresponding to the scratch. Thus, if there is a scratch near the test pattern, the amount of change of the color displacement amount calculated by the updating unit 12 may exhibit a value different from an actual value. If the color displacement amount is updated by using the erroneous amount of change of the color displacement amount, an erroneous update is performed.

Thus, by providing the step S110 of determining whether the amount of change of the color displacement amount is within the normal range, an abnormal value of the amount of change can be prevented from being reflected in the updating process, thus preventing an erroneous updating of the color displacement amount.

In accordance with the present embodiment, the amount of change of the color displacement amount is detected at regular intervals as described above. Because the amount of change of the color displacement amount in a short time during the detection at regular intervals is normally not large, the width of the normal range may be set to a small value (such as plus or minus several dozen microns).

When one of the elements of the amount of change of the color displacement amount exhibits an abnormal value due to the influence of a scratch and the like on the intermediate transfer belt 8, a normal value may not be detected for one or more other elements of the normal amount of change of the color displacement amount. Thus, when an abnormal value is detected in any one of the elements of the amount of change of the color displacement amount, calculation and updating of the other elements of the amount of change of the color displacement amount may not be performed. Preferably, when two or more elements of the amount of change of the color displacement amount exhibit abnormal values, calculation and updating of the other elements of the amount of change of the color displacement amount may not be performed.

In FIG. 3, the absolute accuracy of the position error detection value of the respective colors depends on the assembly accuracy of the detecting units 11a through 11c or their positional changes over time. Increasing the positional or assembly accuracy of the detecting unit 11 may result in a cost increase. Further, even if prior calibration is performed, positional variations may be caused over time due to thermal deformation and the like of supporting members. In addition, if a calibration operation needs to be performed each time the test pattern detection is performed, color displacement correction may not be achieved without lowering productivity.

Thus, in accordance with an embodiment, the color displacement of each of the colors (C, M, Y) relative to a predetermined reference color (such as black "K") is determined, and the color displacement is corrected (see equations (6) through (9)). Because the human visual characteristics are capable of more readily recognizing relative displacements, correction of relative color displacements is sufficient.

It goes without saying that test patterns and detecting units other than those described above may be available according to the related art. Such test patterns and detecting units may also be applied in an image forming apparatus according to an embodiment of the present invention with or without modifying what has been described in the foregoing.

In FIG. 2, with respect to each print job, the write control unit 5 (see FIG. 1) outputs the sub-scan synchronization signals for the various colors having time differences corresponding to the distances between the photosensitive bodies. In order to reduce buffer memory provided in the write control unit 5, the test pattern data and image data may be output with the time difference for each color. Namely, the write control unit 5 may be configured to output the test pattern output instructing signal to the test pattern generating unit 1 for each color and generate the image data transfer request signal for each color based on the sub-scan synchronization signal. Alternatively, the sub-scan synchronization signal may be input to the print job control unit 13 so that the print job control unit 13 can generate the test pattern output instructing signal and the image data transfer request signal for each color.

Figure 8:
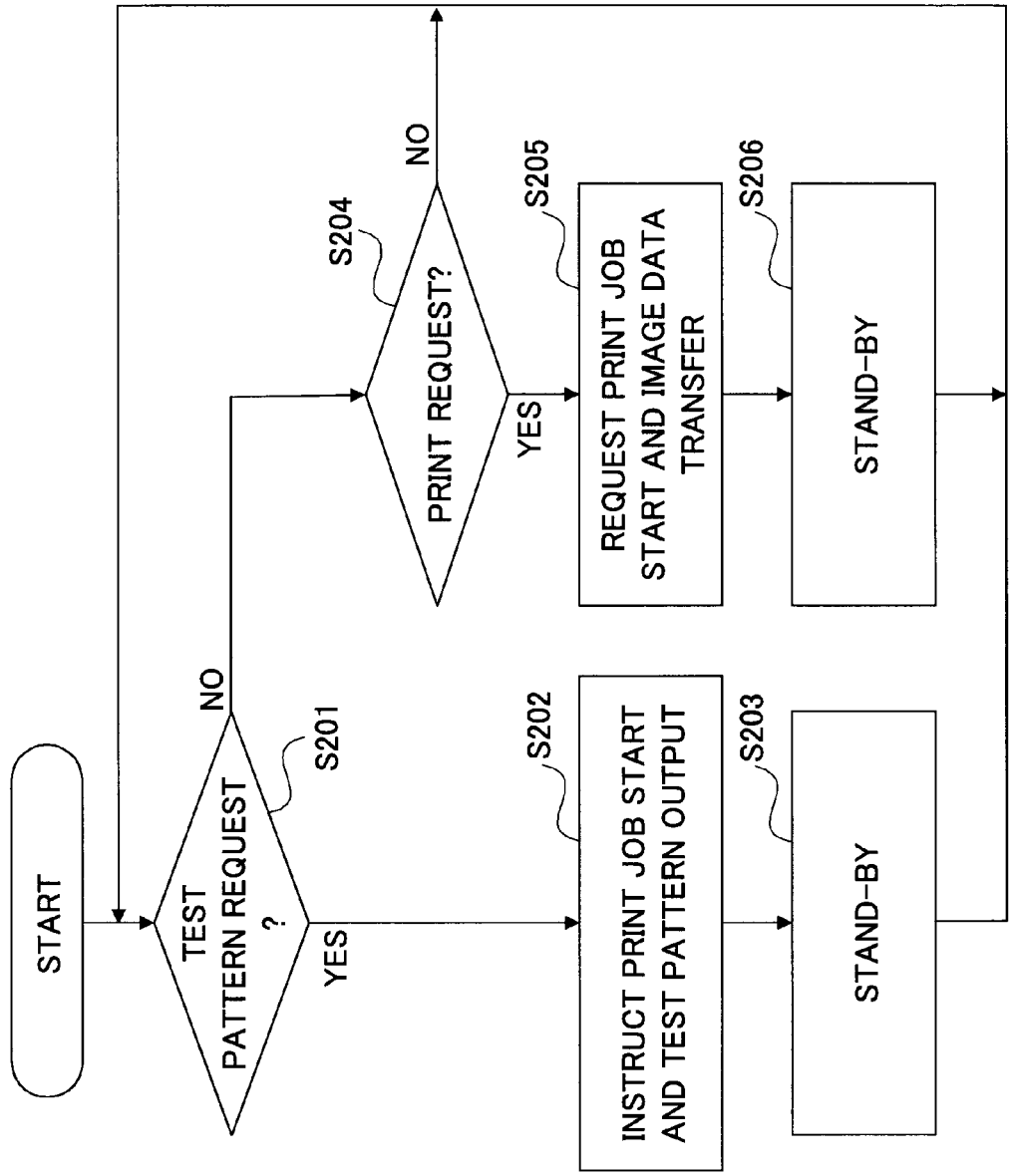
FIG. 8 is a flowchart of a process of controlling a print job start instruction.

FIG. 8 is a flowchart of a process of controlling a print job start instruction in the print job control unit 13.

In step S201, it is determined whether there is a test pattern data generation request. If there is, the process goes on to step S202. In step S202, the print job control unit 13 generates a test pattern output instructing signal and outputs it to the generating unit 1. In step S203, the process stands by for a time corresponding to the output time for the test pattern (Ttp in FIG. 2) so that no other print jobs are issued during the output time. The process then returns to step S201.

When there is no test pattern data generation request in step S201, the process goes onto step S204. The test pattern generation request may be issued by a routine separately provided in the print job control unit 13 which is configured to issue the generation request after the time Ts elapses from the previous test pattern output instructing signal. Alternatively, the routine may be configured to issue the generation request upon issuing of a predetermined number of print-job-start instructing signals from the previous test pattern output instructing signal. In step S204, the print job control unit 13 determines whether there is a print request. If there is, the routine proceeds to step S205; if not, the routine returns to step S201.

In step S205, the print job control unit 13 generates a print-job-start instructing signal and issues an image data transfer request. In step S206, the process stands by for a time corresponding to an output time for image data (i.e., Tprint in FIG. 2, which may differ depending on the size of the sheet to be printed). The time is provided so that no other print jobs are generated during the output time Tprint for image data. The routine then returns to step S201.

By issuing the print job start instruction for the test pattern and normal image in accordance with the flowchart of FIG. 8, the test pattern can be formed at predetermined intervals without overlapping the image forming area.

Figure 9:
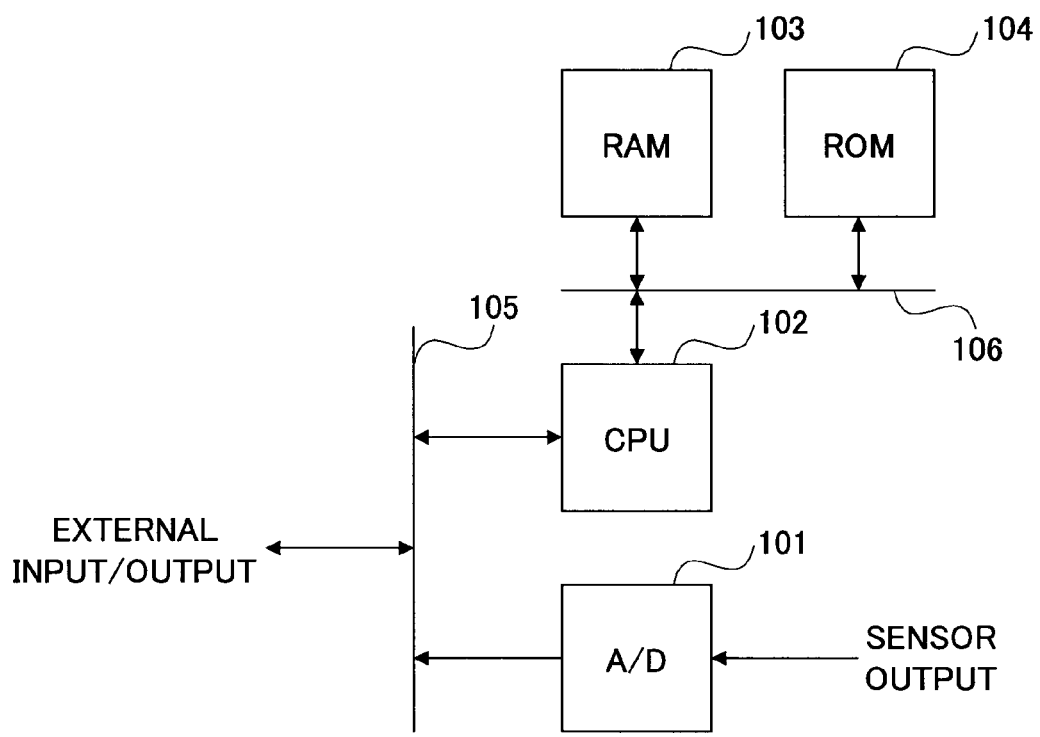
FIG. 9 is a block diagram of a hardware configuration of the image forming apparatus according to an embodiment.

FIG. 9 is a block diagram of a hardware configuration in which a program and the like for realizing the functions of the updating unit 42, the storage unit 43, and the print job control unit 13 is implemented. The hardware configuration may include the engine controller for controlling the timing of operation of the various units of the image forming apparatus.

An A/D converter 101 receives an output from the detecting unit 11 and converts the output into digital data which is supplied to the I/O (input/output) port 105. Alternatively, the output from an A/D converter 101 may be supplied onto an I/O port 105 via a signal processing unit for performing signal processing such as filtering or a buffer memory (both not illustrated).

The I/O port 105 is connected to an external block and may be used for exchanging input or output signals with a CPU 102. The print request signal may be input, the print-job-start instructing signal may be issued, or the color displacement amount may be updated in the correcting unit 3 via the I/O port 105.

The CPU 102 may exchange input or output signals with the outside via the I/O port 105 in order to calculate a color displacement amount or perform print job start control. The CPU 102 may be connected to a RAM 103 and a ROM 104 via a memory bus 106.

The ROM 104 may store various programs, such as a program for calculating or updating the color displacement amount.

Embodiment 3

Embodiment 3 may be preferable when a linear characteristics factor of the color displacement amount has a large amount of change with respect to temperature changes over time, and a non-linear characteristics factor of the color displacement amount has little (or sufficiently small compared to a permissible value of color displacement) of change with respect to temperature changes. Because the non-linear component of the color displacement amount has little variation with respect to temperature change, a series of test patterns for detecting non-linear characteristics of color displacement may be formed at the time of manufacture or at an arbitrary timing, and an image of such test patterns may be read by an image reading apparatus such as a scanner. Then, non-linear characteristics data of color displacement, i.e., non-linear component data, is acquired from the color displacement amount of each of the test patterns in advance. Then, when a job for normal image formation (i.e., printing) is performed, a test pattern for color displacement detection is formed in an area outside the image forming area (i.e., outside any of the image forming areas in the sub-scan direction) on the intermediate transfer body (such as a belt), so that the test pattern would not interface with the job for normal image formation. The test pattern is formed by using test pattern data corrected based on the linear component data and non-linear component data of the color displacement amount stored in the apparatus. If there is a variation in the color displacement amount, the test pattern is formed at a position displaced from the position of the previous test pattern. Thus, a position error is detected as an amount of change (linear component) of the color displacement amount. Based on the amount of change of the color displacement amount, the linear component data of the color displacement amount is newly calculated, and the linear component data of the color displacement amount stored in the apparatus is updated with the newly calculated linear component data. Because of the updating, the linear component data of the color displacement amount stored in the apparatus represents the latest color displacement amount at all times. Based on the linear component data that is updated over time and the non-linear component data that is acquired in advance, the input image and test pattern data are corrected.

Figure 10:
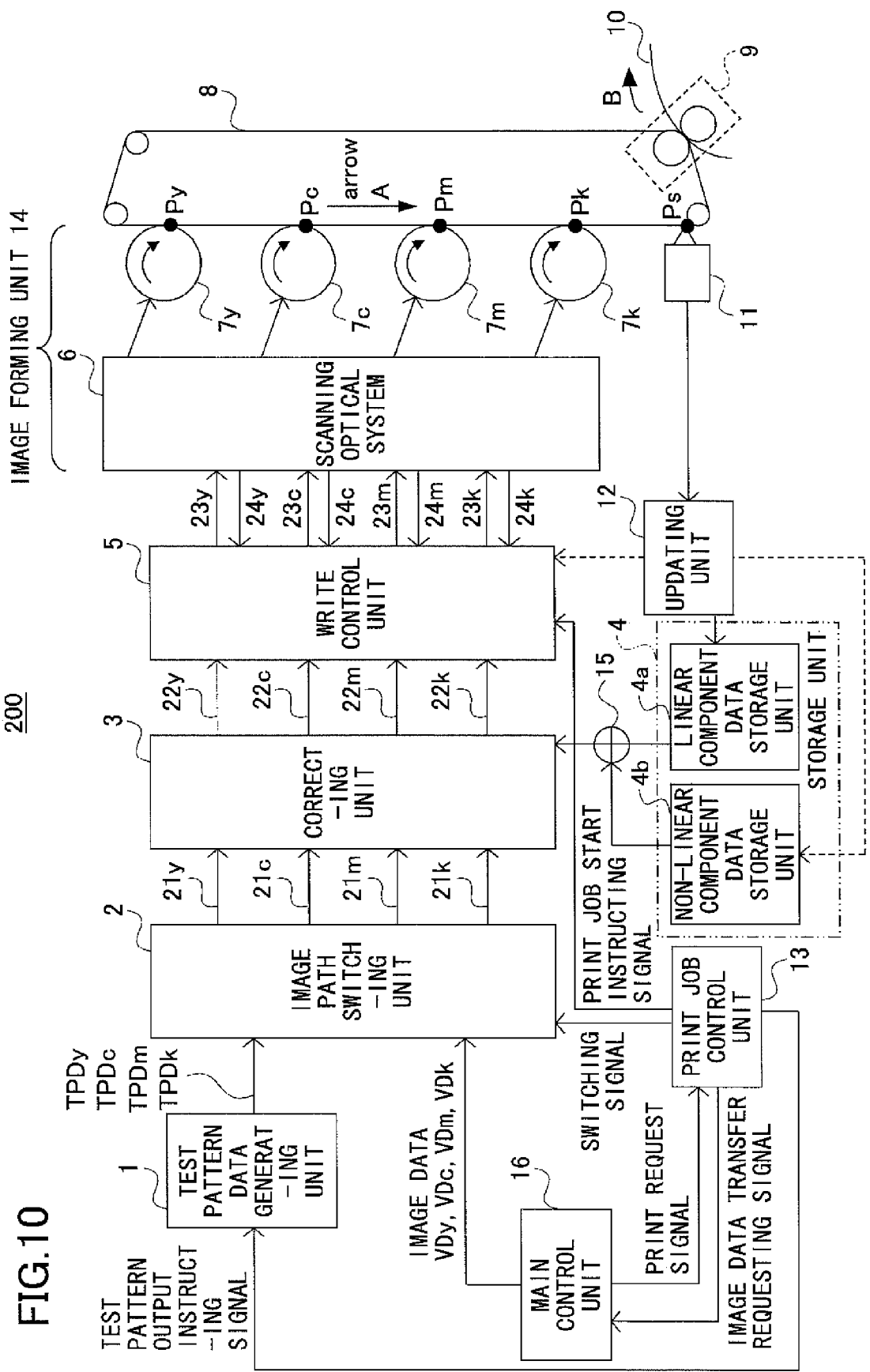
FIG. 10 is a block diagram of an image forming apparatus according to another embodiment.

FIG. 10 is a block diagram of main portions of an image forming apparatus 200 according to Embodiment 3.

The image forming apparatus 200 according to the present embodiment is of a tandem-type including plural image forming units for various colors. In FIG. 10, the image forming apparatus 200 includes a test pattern data generating unit 1, an image path switching unit 2, a correcting unit 3, a storage unit 4, a write control unit 5, and a scanning optical system 6. Further, the image forming apparatus 200 includes plural photosensitive bodies (image carriers) 7y, 7c, 7m, and 7k corresponding to the various colors of yellow (Y), cyan (C), magenta (M), and black (K), respectively, an intermediate transfer belt 8 (intermediate transfer body) rotated in a direction indicated by an arrow A, a secondary transfer unit 9, a detecting unit 11, an updating unit 12, a print job control unit 13, a data adding unit 15, and a main control unit 16.

In accordance with the present embodiment, plural images having the colors of Y, C, M, and K are formed on the respective photosensitive bodies 7y, 7c, 7m, and 7k. Preferably, at least two of the colors may be used, or other colors may be used. The number of colors is not particularly limited and may be five or more. When the members, units, apparatuses, signals, or data are referenced for individual colors, the members, units, apparatuses, signals, or data may be designated by affixing their reference numerals with signs y, c, m, or k, as needed. Any of the photosensitive bodies 7y, 7c, 7m, and 7k may be referred to as a "photosensitive body 7".

In FIG. 10, the test pattern data generating unit 1, upon reception of a test pattern output instructing signal from the print job control unit 13 for controlling a print job as an image forming job, generates and outputs test pattern data TPDy, TPDc, TPDm, and TPDk for color displacement detection for the various colors Y, C, M, and K. The test pattern data includes data as a basis for a test pattern. The test pattern may be used for color displacement detection.

The image path switching unit 2 switches its outputs between image data VDy, VDc, VDm, and VDk for the various colors transmitted from the main control unit 16 and the test pattern data TPDy, TPDc, TPDm, and TPDk for the various colors from the test pattern data generating unit 1. In the example of FIG. 10, the image data VDy, VDc, VDm, and VDk and test pattern data TPDy, TPDc, TPDm, and TPDk output from the image path switching unit 2 are collectively designated by reference numerals 21y, 21c, 21m, and 21k. Namely, the data 21y, 21c, 21m, and 21k for the various colors output from the image path switching unit 2 include the image data VDy, VDc, VDm, and VDk and the test pattern data TPDy, TPDc, TPDm, and TPDk which are switched. The switching by the image path control unit 2 may be controlled by a switching signal from the print job control unit 13.

The correcting unit 3, by using color displacement amount characteristics data acquired from the storage unit 4 indicating the current amount of color displacement, corrects the data 21y, 21c, 21m, and 21k (image data VDy, VDc, VDm, and VDk and test pattern data TPDy, TPDc, TPDm, and TPDk) output from the image path switching unit 2, such that the color displacement amount can be canceled. Corrected data 22y, 22c, 22m, and 22k from the correcting unit 3 (i.e., the image data and test pattern data after correction) are output to the write control unit 5. The color displacement amount characteristics data may be acquired from the storage unit 4 prior to correcting head portions of the image data VDy, VDc, VDm, and VDk. While an output image (i.e., a sheet of recording medium) or a set of test patterns is being corrected, the same color displacement amount characteristics data may be used for correction. A concrete method for such correction is described later.

The storage unit 4 includes a linear component data storage unit 4a and a non-linear component data storage unit 4b. The linear component data storage unit 4a and the non-linear component data storage unit 4b store the linear component data and the non-linear component data, respectively, of the color displacement amount characteristics data indicating the current color change amount of each color. The linear component data indicates the linear characteristics of the color change amount. The non-linear component data indicates the non-linear characteristics of the color change amount. The linear component data stored in the linear component data storage unit 4a is updated by the updating unit 12. The non-linear component data storage unit 4b may store non-linear component data indicating the non-linear characteristics of the color displacement amount for each color that is acquired at the time of manufacture or at an arbitrary timing. The details of the linear component data and non-linear component data, and concrete methods for updating the linear component data will be described later.

The data adding unit 15 adds the current linear component data of the color displacement amount that is output from the linear component data storage unit 4a to the non-linear characteristics component of the color displacement amount output from the non-linear component data storage unit 4b in order to output the current color displacement amount characteristics data.

The write control unit 5 generates main-scan synchronization signals from the line synchronization signals 24y, 24c, 24m, and 24k for the various colors. The line synchronization signals 24y, 24c, 24m, and 24k for the various colors indicate the timing of passage of a light beam from the scanning optical system 6 for each color past a predetermined position. The main-scan synchronization signals indicate write-start positions in the main scan direction. The write control unit 5, with reference to the print-job-start instructing signal input from the print job control unit 13, or a write-start instruction from the engine controller unit (not illustrated), generates sub-scan synchronization signals for each color in accordance with time differences between the respective colors that are determined by the distance between the photosensitive bodies (such as the distance between Py and Pc in FIG. 1) and the linear speed V of the intermediate transfer belt 8. The sub-scan synchronization signals indicate write-start positions in the sub-scan direction. With reference to a pixel clock generated in the write control unit 5, and in synchronism with the main-scan synchronization signals and the sub-scan synchronization signals, the write control unit 5 converts, for each color, the corrected data (corrected image and test pattern data) 22y, 22c, 22m, and 22k into write signals 23y, 23c, 23m, and 23k which are modulating signals for the light sources in the scanning optical system 6. Thus, the corrected image data for each color are developed on the corresponding photosensitive bodies, and the developed images are transferred onto the intermediate transfer belt 8 and superposed upon one another thereon.

The scanning optical system 6 is provided for the photosensitive body 7 of each color. In the example of FIG. 10, the scanning optical systems for the various colors are collectively illustrated as the scanning optical system 6. The light sources in the scanning optical systems 6 scan the surfaces of the photosensitive bodies 7y, 7c, 7m, and 7k, which are uniformly charged by charging units (not illustrated), with light beams in accordance with the corrected data (corrected image data and test pattern data) 22y, 22c, 22m, and 22k, thus forming latent images and test patterns on the photosensitive bodies 7. Developing units (not illustrated) develop the latent images on the photosensitive bodies 7 by using toner. The images and test patterns of each color developed on the respective photosensitive bodies 7 are then transferred onto the intermediate transfer belt 8 at primary transfer positions (or portions) Py, Pc, Pm, and Pk for primary transfer. After the primary transfers, an output image formed by the superposition of the images of the various colors is transferred onto a recording sheet 10 (recording medium) by a secondary transfer unit 9 for secondary transfer while the recording sheet 10 is being transferred in a direction indicated by an arrow B. The output image on the recording sheet 10 is then fused onto the recording sheet 10 by a fusing unit (not illustrated). The timing of those operations may be controlled by the main control unit 16 (or the engine controller unit).

The detecting unit 11 reads the test patterns formed on the intermediate transfer belt 8. The timing of operation of the detecting unit 11 is controlled such that the detecting unit 11 can sample the test patterns at a detection position. The detecting unit 11 may include an optical sensor configured to optically detect the test patterns on the intermediate transfer belt 8.

The updating unit 12 detects a displacement between an output value of the detecting unit 11 that has sampled the test patterns on the intermediate transfer belt 8 and a target value (ideal value), as an amount of change of the color displacement amount. Based on the detected amount of change of the color displacement amount and the previous amount of change of the color displacement amount, the updating unit 12 calculates new linear component data of the color displacement amount. Then, the updating unit 12 updates the linear component data stored in the linear component data storage unit 4a with the newly calculated linear component data of the color displacement amount. Because of the updating, even if the linear component of color displacement amount is varied by a temperature change and the like, the latest linear component data of the color displacement amount after such variation can be stored in the linear component data storage unit 4a at all times.

The print job control unit 13 controls the timing of a print job. The "print job" may refer to the process of forming an output image on the intermediate transfer belt 8, or the process of forming a set of test patterns on the intermediate transfer belt 8. The print job control unit 13, based on a print request signal received from the main control unit 16, generates a print-job-start instructing signal and outputs the print-job-start instructing signal to the write control unit 5. The print job control unit 13 also inserts a test pattern print job between image print jobs at predetermined intervals, and generates a corresponding print-job-start instructing signal and outputs the print-job-start instructing signal to the write control unit 5. Also, the print job control unit 13 generates an image data transfer request signal upon starting of a normal image print job, and generates a test pattern output instructing signal upon starting of a test pattern print job. The print-job-start instructing signal may be output to the engine controller unit (not illustrated) and the write control unit 5 in order to perform timing control in various units with reference to the print-job-start instructing signal as a start reference. The engine controller unit (not illustrated) may perform various controls with regard to various units, including the timing control.

The image forming unit 14, which is provided for each of the various colors, includes the scanning optical system 6 and the photosensitive body 7. The image forming unit 14 also includes a charging unit and a developing unit which are not illustrated but may be disposed around the photosensitive body. Thus, the image forming unit 14, based on the corrected data (corrected image data and test pattern data) 22y, 22c, 22m, and 22k corrected by the correcting unit 3, forms a color output image and a test pattern on the intermediate transfer belt 8. A color displacement may be caused in the write control unit 5 or units or portions subsequent to it, as will be described later.

In the image forming apparatus according to the present embodiment, as described above, the write control unit 5 controls the process of printing a print job such that images for the various colors can be output from the photosensitive bodies to the intermediate transfer belt 8 with a time difference corresponding to the distance between the photosensitive bodies. In order to reduce the buffer memory provided in the write control unit 5, the test pattern data and image data may be output with such time difference for each color. Namely, the write control unit 5 may be configured to output the test pattern output instructing signal for each color to the test pattern data generating unit 1 based on the sub-scan synchronization signal and issue an image data transfer request signal for each color. Alternatively, the sub-scan synchronization signal may be input to the print job control unit 13 so that the print job control unit 13 can generate the test pattern output instructing signal and the image data transfer request signal for each color.

(Method of Calculating Color Displacement Amount Characteristics Data)

A method of calculating the color displacement amount characteristics data for correcting input image data and test pattern data is described.

The color displacement amount characteristics data include two types of components (factors), namely linear component data and non-linear component data. The linear component corresponds to factors that exhibit linear characteristics. The non-linear component data correspond to factors that exhibit non-linear characteristic. The linear component data and non-linear component data are separately stored. The linear component data is stored in the linear component data storage unit 4a, while the non-linear component data is stored in the non-linear component data storage unit 4b. The linear component data and the non-linear component data may be added by the data adding unit 15, and an added result may be used as the color displacement amount characteristics data for correcting the input image data and test pattern data.

In accordance with Embodiment 3, the non-linear characteristics of the color displacement amount are caused in the main scan direction. An example of the factors of the non-linear characteristics of a position error (color displacement) Δx in the main scan direction with respect to a coordinate position (hereafter referred to as a "main scan position") x in the main scan direction is a partial magnification ratio deviation in the main scan direction. An example of the factors of non-linear characteristics of a position error (color displacement) Δy in the sub-scan direction with respect to the main scan position x is a scan curving (bowing).

Figure 11:
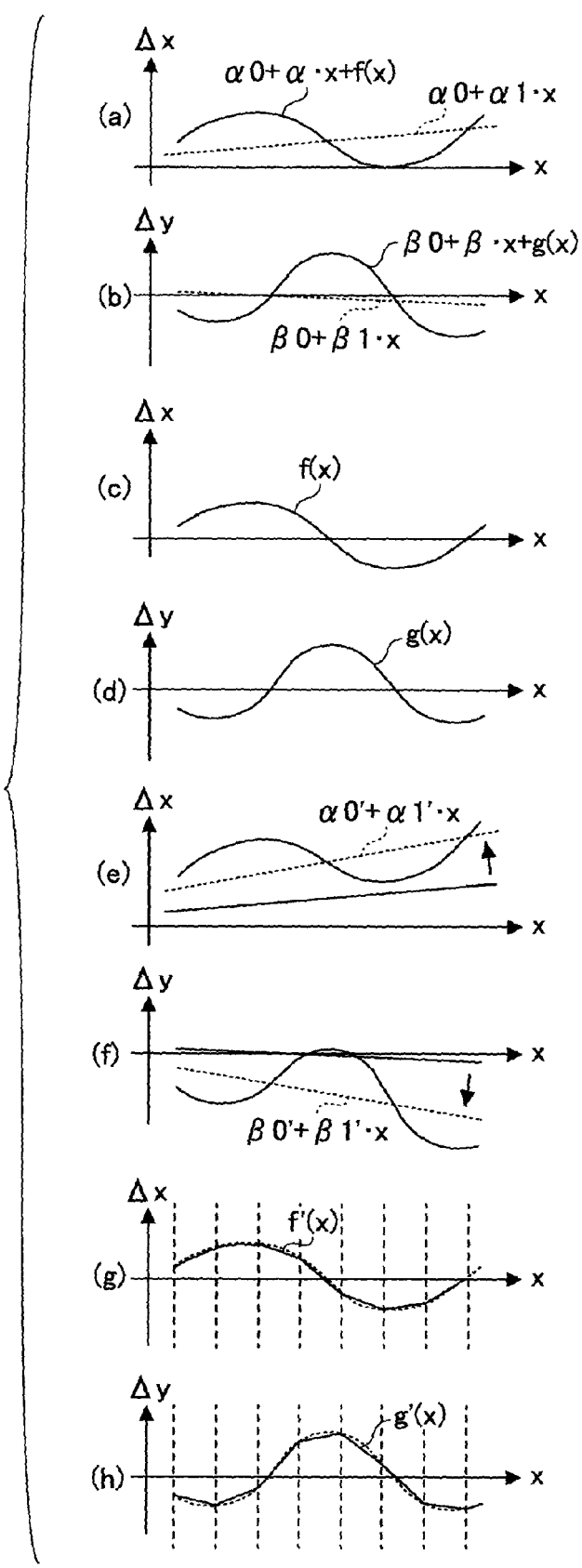
FIGS. 11(a) through 11(h) are graphs illustrating displacement characteristics of an image.

FIGS. 11(a) and 11(b) illustrate displacement characteristics Δx(x) and Δy(x) in the main and sub-scan directions, respectively, with respect to the main scan position x. The displacement characteristics Δx(x) in the main scan direction and the displacement characteristics Δy(x) in the sub-scan direction with respect to the main scan position x may be approximated by polynomial equations as follows.

$$\Delta x(x) = \alpha 0 + \alpha 1 \cdot x + \alpha 2 \cdot x^2 + \alpha 3 \cdot x^3 + \ldots \quad (13)$$

$$\Delta y(x) = \beta 0 + \beta 1 \cdot x + \beta 2 \cdot x^2 + \beta 3 \cdot x^3 + \ldots \quad (14)$$

In equations 13 and 14, the components of the 0-order and 1st-order terms represent linear characteristics, while the higher-order components (second-order and higher) represent the non-linear characteristics. When the sum of the high-order components indicating the non-linear characteristics is expressed by functions f(x) and g(x), equations 13 and 14 may be expressed as follows.

$$\Delta x(x) = \alpha 0 + \alpha 1 \cdot x + f(x) \quad (13')$$

$$\Delta y(x) = \beta 0 + \beta 1 \cdot x + g(x) \quad (14')$$

In equation 13 and equation 13', the 0-order coefficient α0 indicates a main-scan registration error (margin error), and the 1st-order coefficient α1 indicates a main-scan overall magnification ratio error. Similarly, the 0-order coefficient β0 of equations 14 and 14' indicate a sub-scan registration error (margin error) while the 1st-order coefficient β1 indicates a skew error.

FIGS. 11(c) and 11(d) illustrate functions f(x) and g(x) indicating the non-linear characteristics of the main-scan direction position error and the sub-scan direction position error, respectively. As mentioned above, the color displacement amount may be changed over time by deformation in an optical system or supporting members due to temperature changes in the apparatus. The amount of variation of the individual coefficients in the equations 1, 1', 2, and 2' due to temperature changes may differ depending on the structure of the optical system (including the material of its constituent elements or supporting members). In accordance with the present embodiment, it is assumed that, as is generally the case, the linear characteristics factors (such as the terms of the coefficients α0, α1, β0, and β1) have large amounts of variation with respect to temperature change, while the non-linear characteristics factors (such as the terms of f(x) and g(x)) have little variation with respect to temperature change (i.e., the amount of variation relative to a color displacement allowable value is sufficiently small. The present embodiment may be suitable for such cases.

FIGS. 11(e) and 11(f) illustrate the change in the linear component of the color displacement amount in the main scan direction and the sub-scan direction due to temperature change. The coefficients α0, α1, β0, and β1 in the above equations are greatly varied, resulting in the coefficients α0', α1', β0', and β1', respectively, after variation. On the other hand, the non-linear components f(x) and g(x) of the above equations are not changed.

The non-linear characteristics f(x) and g(x) may be divided into plural regions in the main scan direction and represented by broken line approximation using a straight line in each of the regions. In this case, the calculation for correcting the input image data may be simplified.

FIGS. 11(g) and 11(h) illustrate the broken line approximations f'(x) and g'(x) of the functions f(x) and g(x) (broken lines) of the non-linear characteristics. In the illustrated example, the characteristics are divided into eight regions at equal intervals in the main scan direction. By thus dividing the functions f(x) and g(x) of the non-linear characteristics into corresponding regions, the number of regions of a color displacement transform matrix can be reduced, as will be described later, whereby the correcting calculations can be simplified. In order to increase the accuracy of broken line approximation, the number of regions may be increased. The intervals of the regions may not be equal intervals. Preferably, the boundaries of the regions may correspond to the maximum and minimum points of the non-linear characteristics curve, so that the difference between the non-linear characteristics curve and the broken line approximation line can be minimized. In this way, the inclination in each region of the non-linear characteristics (broken line approximation) in the main scan direction illustrated in FIG. 11(g) corresponds to a deviation of the main-scan partial magnification ratio from the overall magnification ratio. When the inclination in the main scan direction in each region is Δa(i) (i is a region number), the main scan partial magnification ratio of each region corresponds to a sum of the main scan overall magnification ratio error α1 and the inclination Δa(i) of each region. Further, when the offset at the starting point of each region in the main scan direction is Δc(i) (i is the region number), the main-scan registration error of each region corresponds to a sum of the main scan registration error (margin error) α0 and an offset Δc(i) at the starting point of each region.

Similarly, the inclination in each region of the non-linear characteristics (broken line approximation) in the sub-scan direction in FIG. 11(h) corresponds to a deviation from the overall skew error in each region. When the inclination of each region in the sub-scan direction is Δd(i) (i is the region number), the skew error of each region corresponds to a sum of the overall skew error β1 and the inclination Δd(i) of each region. When the offset at the starting point in each region in the sub-scan direction is Δf(i) (i is the region number), the sub-scan registration error of each region corresponds to a sum of the sub-scan registration error (margin error) β0 and the offset Δf(i) at the starting point of each region.

(Method of Deriving Various Components of the Color Displacement Amount)

A method of deriving various components of the color displacement amount is described. First, a method is described for calculating color displacement amount components caused by linear characteristics factors, including skew error, registration error (which may be also referred to as "margin error" or "offset error") in the sub-scan direction, overall magnification ratio error in the main scan direction, and registration error in the main scan direction, based on a result of detection of the test patterns illustrated in FIG. 4. In this calculating method, the color displacement amount of the various colors (C, M, Y) is calculated with respect to the reference color of black (K).

The distances (unit: mm) between the test patterns measured by the detecting unit (sensor) 11 is defined as illustrated in FIG. 4. Specifically, the distance between the straight line pattern 61k of the reference color K and the straight line pattern 61c of a target color (such as C) is referred to as "L1c". Similar distances L1m and L1y (not illustrated) are measured for the other target colors M and Y. The distance measured between the straight line pattern 61 and the inclined line pattern 62 of the same color is referred to as "L2", with the color indicated by its suffix. For example, the distance for cyan is designated as "L2c".

An ideal distance (namely, the distance between the test patterns output from the test pattern data generating unit 1) between the straight line pattern 61$k$ of the reference color K and the straight line pattern 61$c$ of the target color (such as C) is referred to as "L1ref". The ideal distance is the same (L1ref) between the straight line patterns 61$k$ and 61$y$. The distance between the straight line patterns 61$k$ and 61$m$ is twice as long, that is 2 times L1ref. The distances measured at the detection positions a, b, and c of the detecting unit 11 are distinguished by suffixes "_a", "_b", and "_c". The distance between the detection positions a and c of the detecting unit 11 is referred to as "Lac". When the measured distances are thus defined, the calculation equations for the various components of the color displacement amount may be expressed as follows.

The calculation equations for the skew error components of the colors (C, M, Y) with respect to black (K) can be expressed by the following three equations, which may be collectively referred to as "equation 15".

$$d(C)=(L1c\_c-L1c\_a)/Lac$$

$$d(M)=(L1m\_c-L1m\_a)/Lac$$

$$d(Y)=(L1y\_c-L1y\_a)/Lac \quad (15)$$

The calculation equations for the registration error component of the various colors (C, M, Y) in the sub-scan direction with respect to black (K) can be expressed by the following three equations, which may be collectively referred to as "equation 16".

$$f(C)=((0.25 \cdot L1c\_a+0.5 \cdot L1c\_b+0.25 \cdot L1c\_c)-L1\text{ref}) \cdot \kappa$$

$$f(M)=((0.25 \cdot L1m\_a+0.5 \cdot L1m\_b+0.25 \cdot L1m\_c)-2 \cdot L1\text{ref}) \cdot \kappa$$

$$f(Y)=((0.25 \cdot L1y\_a+0.5 \cdot L1y\_b+0.25 \cdot L1y\_c)-L1\text{ref}) \cdot \kappa \quad (16)$$

where κ is a coefficient for converting the unit of distance from millimeters to dots. For example, when the input image data has 1200 dpi, κ=1200/25.4.

The calculation equations for the overall magnification ratio error components of the various colors (C, M, Y) with respect to black (K) in the main scan direction can be expressed by the following three equations, which may be collectively referred to as "equation 17".

$$a(C)=((L2c\_c-L2k\_c)-(L2c\_a-L2k\_a))/Lac$$

$$a(M)=((L2m\_c-L2k\_c)-(L2m\_a-L2k\_a))/Lac$$

$$a(Y)=((L2y\_c-L2k\_c)-(L2y\_a-L2k\_a))/Lac \quad (17)$$

The calculation equations for the registration error component of the various colors (C, M, Y) with respect to black (K) in the main scan direction can be expressed by the following three equations, which may be collectively referred to as "equation 18".

$$c(C)=((L2c\_a-L2k\_a)-Lbd \cdot a(C)) \cdot \kappa$$

$$c(M)=((L2m\_a-L2k\_a)-Lbd \cdot a(M)) \cdot \kappa$$

$$c(Y)=((L2y\_a-L2k\_a)-Lbd \cdot a(Y)) \cdot \kappa \quad (18)$$

where Lbd is the distance between the detection position of a synchronization detecting sensor and the detection position of the detecting unit (sensor) 11$a$. The synchronization detecting sensor is provided in the scanning optical system for each of the various colors in order to generate a line synchronization signal 24 upon passing of a light beam. The term of "Lbd·a(C)" is a term for subtracting from the registration error a position error produced by a magnification ratio error in the main scan direction in a scan period between the detection position of the synchronization detecting sensor as the main-scan-direction synchronization position and the detection position of the detecting unit (sensor) 11$a$ for calibration purpose.

When the test patterns are formed in the test pattern forming area 54 illustrated in FIG. 3, equation 16 may be modified into the following three equations (equation 16') with regard to the registration error in the sub-scan direction. For the other error components (skew error, main-scan-direction magnification ratio error, and main-scan-direction registration error), the same equations may be used.

$$f(C)=((0.5 \cdot L1c\_a+0.5 \cdot L1c\_c)-L1\text{ref}) \cdot \kappa$$

$$f(M)=((0.5 \cdot L1m\_a+0.5 \cdot L1m\_b)-L1\text{ref}) \cdot \kappa$$

$$f(Y)=((0.5 \cdot L1y\_a+0.5 \cdot L1y\_b)-L1\text{ref}) \cdot \kappa \quad (16')$$

The error components calculated according to equations 15 through 18 correspond to the coefficients of equations 13 and 14. For example, the coefficient α0 corresponds to the error component c of equation 18, and the coefficient α1 corresponds to the error component a of equation 17. The coefficient β corresponds to the error component f of equation 16 or 16', and the coefficient β1 corresponds to the error component d of equation 15.

Various patterns for color displacement detection have been proposed other than the test patterns illustrated in FIG. 4. Such known patterns may be used for determining the various error amount components.

Next, a description is given of a method for calculating the components of the color displacement amount caused by non-linear characteristics factors, i.e., the above-described f(x) and g(x) or their broken line approximation lines.

The components of the color displacement amount caused by the non-linear characteristics factors may be acquired at an appropriate timing, such as at the time of manufacture or replacement of units, or upon maintenance by service personnel or a user. For example, a test chart illustrated in FIGS. 12($a$) and 12($b$) may be printed as a normal image and then read with an image reading apparatus such as a scanner. Based on the acquired image data, a non-linear component of the color displacement amount is acquired. The image reading apparatus may be provided either inside or outside the image forming apparatus according to the present embodiment. Preferably, the test chart may be formed on the intermediate transfer belt 8. In this case, the test chart may not be transferred onto a sheet and the like for secondary transfer.

Figure 12A:
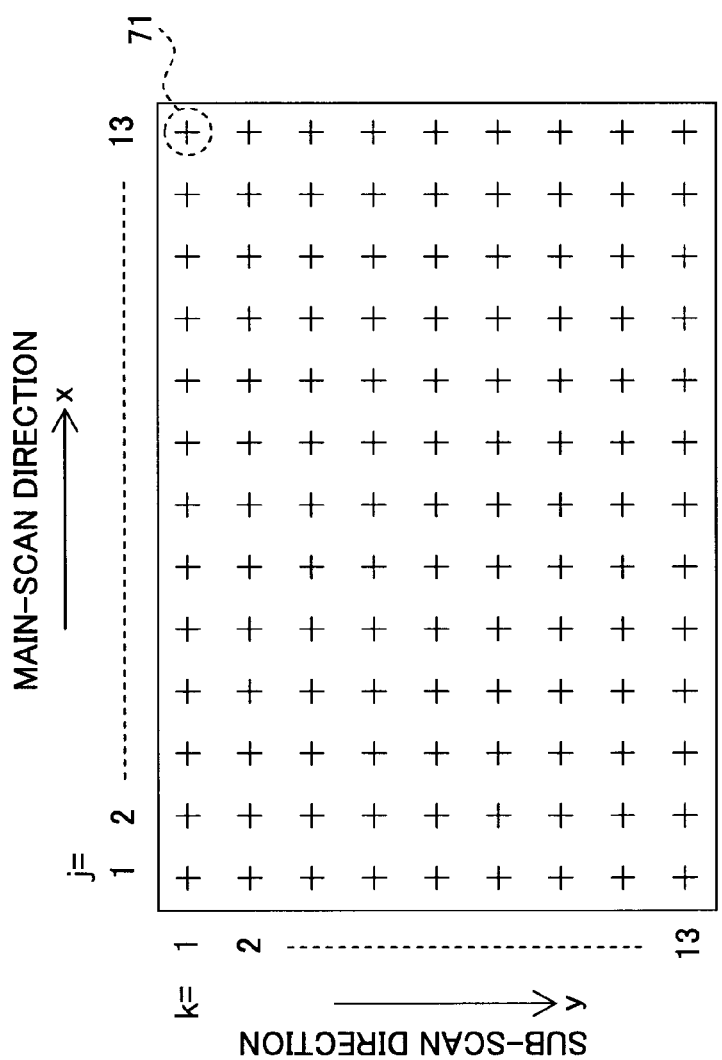
FIG. 12A illustrates a test chart printed for acquiring non-linear characteristics.
Figure 12B:
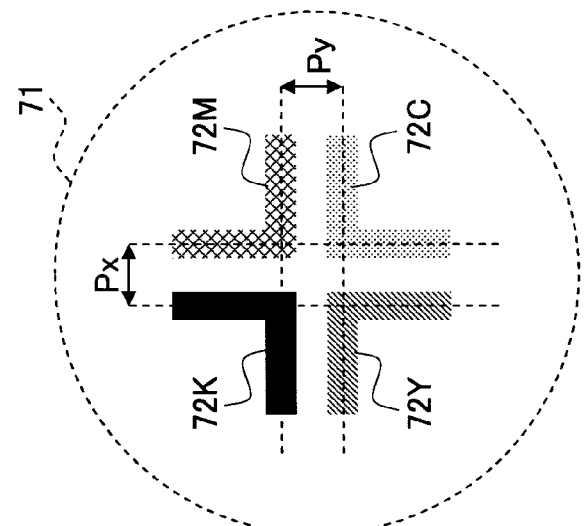
FIG. 12B illustrates one of patterns in the test chart of FIG. 12A.

FIG. 12($a$) illustrates an example of the test chart which may be printed in order to acquire the non-linear characteristics. FIG. 12($b$) is an enlarged view of one of the patterns 71 in the test chart. In the illustrated example of FIG. 12($a$), thirteen patterns 71 are arranged in the main scan direction and nine patterns 71 are arranged in the sub-scan direction, both at equal intervals. The number of the patterns 71 is not particularly limited. Preferably, the patterns 71 may not be arranged at equal intervals.

Each of the patterns 71 includes L-shaped patterns 72C, 72M, 72Y, and 72K for the various colors of cyan, magenta, yellow, and black arranged at an interval Px in the main scan direction and Py in the sub-scan direction. Based on the image data read from the printed test chart, of the patterns 71 disposed at the respective positions j and k in the main and sub-scan directions, respectively, the apex of each of the L-shaped patterns for the various colors (i.e., the point of intersection of the lines in the main- and sub-scan directions) is determined. Then, a displacement of the apex from the ideal value Px or Py is measured in order to calculate a color displacement amount near the apex. The color displacement amount in the main-scan direction and sub-scan direction at the position j, k is referred to as "Δxjk" (main-scan-direction error) and "Δyjk" (sub-scan-direction error), respectively. The color displacement amount is determined for each of the patterns, namely the thirteen patterns in the main scan direction times the nine patterns in the sub-scan direction.

In accordance with the present embodiment, an example is described in which non-linear characteristics are present in the main scan direction. Thus, at each of the position j in the main-scan direction, an average is taken in the sub-scan direction (k=1 through 9) with regard to each of the main-scan-direction error Δx and the sub-scan-direction error Δy, thus determining Δxj (main-scan-direction error) and Δyj (sub-scan-direction error). In this way, noise components or detection errors can be cancelled. Thus, the color displacement amounts with respect to the main scan position j (Δxj, Δyj) can be determined and may be plotted as illustrated in FIGS. 12(*a*) and 12(*b*). In FIGS. 12(*a*) and 12(*b*), the main scan position j is converted into an actual distance x.

As described above, the non-linear characteristics correspond to the color displacement amount (Δxj, Δyj) with respect to the main scan position j from which the zero-order component and the first-order component have been subtracted. Thus, f(x) and g(x) can be determined by determining a straight line approximating the color displacement amount (Δxj, Δyj) and then subtracting the zero-order component and the first-order component from the straight line. Further, as described above, broken line approximation lines of the non-linear characteristics may be determined. For example, the number of regions divided in the main scan direction is 14 (i.e., the number of patterns (13) in the main scan direction plus one). The color displacement amounts (Δxj, Δyj) at j=1 through 13 are connected. When the values of the approximation lines are Δxj' and Δyj', the line connecting these values corresponds to the broken line approximation lines f'(x) and g'(x). For example, the deviation La(1) of the partial magnification ratio of the region (1) in the main scan from the overall magnification ratio is (Δx2'−Δx1')/Lx (where Lx is the distance between the patterns disposed at j=1 and 2). Thus, in each region (i), the starting point position x of the region, offsets Δc(i) and Δf(i) at the starting point, and inclinations Δa(i) and Δd(i) in the region are calculated. A result of the calculation is stored in the non-linear component data storage unit 4*b* as non-linear component data of the color displacement amount.

The number of the regions divided in the main scan direction may not correspond to the number of patterns in the main scan direction but may be reduced for simplicity. Preferably, the number of the patterns may be increased in order to increase the accuracy of the broken line approximation line.

During the printing of the test chart, the correcting unit 3 may not correct image data, and the non-linear component data (f(x), g(x) or f'(x), g'(x)) determined as described above may be stored in the non-linear component data storage unit 4*b* as is as the non-linear component data. Preferably, the test chart may be printed so that the correcting unit 3 can correct the image data in accordance with the color displacement amount that is stored at the moment. In this case, the non-linear characteristics (f(x), g(x) or f'(x), g'(x)) determined as described above are a difference from the non-linear component data stored in the non-linear component data storage unit 4*b*. Thus, the non-linear component data stored in the non-linear component data storage unit 4*b* may be updated by adding the non-linear component data (determined as described above) to the non-linear component data in the storage unit 4*b*.

(Method of Correcting Color Displacement Amount)

A method of correcting the color displacement amount by the correcting unit 3 is described. When the data (input image data and test pattern data) 21*y*, 21*c*, 21*m*, and 21*k* input into the correcting unit 3 may be expressed by coordinates (x, y), the corrected data 22*y*, 22*c*, 22*m*, and 22*k* output from the correcting unit 3 is expressed by coordinates (x', y'), and coordinates (x'', y'') are defined on the intermediate transfer belt 8, the color displacement of the various colors that is caused in the write control unit 5 or thereafter may be expressed by a coordinate transform according to the following equation by using the components of the color displacement amount of the various colors (C, M, Y) with respect to black (K).

$$\begin{pmatrix} x'' \\ y'' \\ 1 \end{pmatrix} = A \cdot \begin{pmatrix} x' \\ y' \\ 1 \end{pmatrix} \quad (19)$$

where $$A = \begin{pmatrix} a' & 0 & c \\ d & 1 & f \\ 0 & 0 & 1 \end{pmatrix}$$

Because the error amount a in equation 17 indicates the magnification ratio error in the main scan direction, an overall magnification ratio a' in the main scan direction is 1+a. Thus, the correcting unit 3, by referring to the color displacement amount characteristics data (a', c, d, f) of the various colors, determines an inverted matrix A-1 (which may be referred to as a "color displacement correcting matrix") of the matrix A (which may be referred to as a "color displacement transform matrix") according to equation 19, and then perform coordinate transform according to equation 20 in order to correct the color displacement amount of the image formed on the intermediate transfer belt 8.

$$\begin{pmatrix} x' \\ y' \\ 1 \end{pmatrix} = A^{-1} \cdot \begin{pmatrix} x \\ y \\ 1 \end{pmatrix} \quad (20)$$

Equations 19 and 20 yield equation 21.

$$\begin{pmatrix} x'' \\ y'' \\ 1 \end{pmatrix} = A \cdot A^{-1} \cdot \begin{pmatrix} x \\ y \\ 1 \end{pmatrix} \quad (21)$$

Thus, $$\begin{pmatrix} x'' \\ y'' \\ 1 \end{pmatrix} = \begin{pmatrix} x \\ y \\ 1 \end{pmatrix}$$

When the non-linear characteristics in the main scan direction are expressed by broken line approximation lines in the regions divided in the main scan direction as described above, the color displacement transform matrix A in equation 21 may be determined for each region, and an inverted matrix may be determined in each region for coordinate transform. In this case, color displacement factors having non-linear characteristics, such as the scan curving (bowing) or the main-scan partial magnification ratio deviation, can be accurately corrected. Namely, when the elements of a color displacement transform matrix Ai for each region are defined according to equation 22, the elements can be expressed by equation 23 including the following four equations. The color displacement transform matrix Ai for the corresponding region is selected depending on the main scan coordinate x of the converted image, and coordinate transform is performed by using an inverted matrix.

$$Ai = \begin{pmatrix} ai' & 0 & ci \\ di & 1 & fi \\ 0 & 0 & 1 \end{pmatrix} \quad (22)$$

$$\begin{aligned} ai' &= a' + \Delta a(i) \\ ci &= c + \Delta c(i) \\ di &= d + \Delta d(i) \\ fi &= f + \Delta f(i) \end{aligned} \quad (23)$$

where a', c, d, and f in equation 23 are the values indicated by the above equations 15 through 18, and $\Delta a(i)$, $\Delta c(i)$, $\Delta d(i)$, and $\Delta f(i)$ are offsets and inclinations in each region of the non-linear characteristics (broken line approximation lines) of the main-scan-direction error and the sub-scan-direction error.

Method of Calculating and Updating Color Displacement Amount Characteristics Data Example 1

Figure 13:
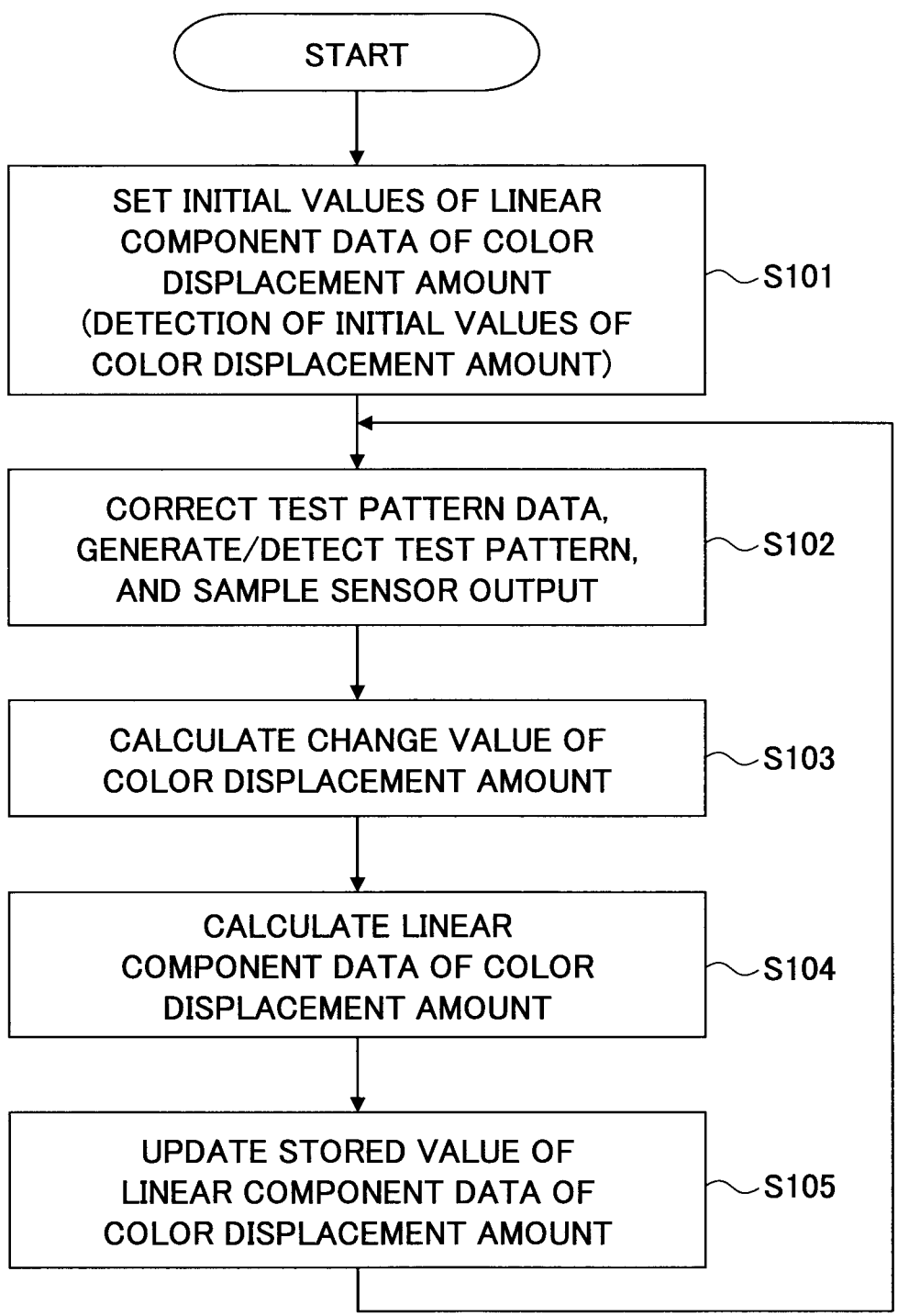
FIG. 13 is a flowchart of a method for calculating and updating color displacement amount characteristics data (linear component data)

FIG. 13 is a flowchart of a method for calculating and updating the color displacement amount characteristics data (linear component data) in the updating unit 12. By the calculations and updating according to the method of FIG. 13, when the linear component data of the color displacement amount is varied by temperature change and the like, the linear component data stored in the storage unit 4 can be updated to the linear component data reflecting the color displacement amount of the current time. The process of calculation and update is performed for each of the various colors (C, M, Y).

In step S101, initial values of the linear component data of the color displacement amount are set. Specifically, the initial values of the linear component data (a', c, d, f) of the color displacement amount are set in the storage unit 4. The initial values may include no color displacement amount (a'=1, c=0, d=0, f=0). Preferably, the linear component data of the color displacement amount that has previously been used may be stored and used as the initial values. Alternatively, test patterns may be formed without color displacement correction and the linear component data of the color displacement amount may be calculated from a result of detection of the test patterns in the color displacement amount initial value detecting step described above, and the results of calculation may be set as the initial values. Further, in the color displacement amount initial value detecting step, average values of results of detection of plural sets of test patterns may be used as the initial values for the color displacement amount so that errors can be smoothed.

In step S102, by referring to the color displacement amount characteristics data (linear and non-linear component data) stored in the storage unit 4 as described above, the color displacement correcting matrix is determined. Using the test pattern data corrected according to the color displacement correcting matrix, test patterns are generated, and the corrected test patterns are detected by the detecting unit 11. Then, the sensor output from the detecting unit 11 is sampled where the sampling timing may be determined by a print-job-start instructing signal as described above. The process stands by in this step until the sampling timing.

In step S103, based on the sensor output sampled in step S102, the linear component data of the color displacement amount is calculated according to equations 15 through 18. The sensor output sampled in step S102 has been corrected in accordance with the color displacement amount characteristics data (linear and non-linear component data) stored in the storage unit 4. Thus, the linear component data of the color displacement amount calculated in this step corresponds to the value of the amount of change ("change value") from the linear component data stored in the storage unit 4. The change value calculated by the n-th test pattern is designated by a suffix "n", such as $\Delta a(n)$, $\Delta c(n)$, $\Delta d(n)$, and $\Delta f(n)$. The test patterns are formed such that the non-linear characteristics of the color displacement amount can also be corrected based on the non-linear component data stored in the non-linear component data storage unit 4b of the storage unit 4. Thus, the non-linear component of the color displacement amount is not added to the calculated change values $\Delta a(n)$, $\Delta c(n)$, $\Delta d(n)$, and $\Delta f(n)$ of the color displacement amount.

In step S104, new linear component data a(n), c(n), d(n), and f(n) of the color displacement amount is calculated from the change values $\Delta a(n)$, $\Delta c(n)$, $\Delta d(n)$, and $\Delta f(n)$ of the linear component data of the color displacement amount calculated in step S103. For example, when the linear component data of the color displacement amount calculated by the previous n−1-th test patterns and stored in the storage unit 4 are a(n−1), c(n−1), d(n−1), and f(n−1), the change values of the linear component data of the color displacement amount calculated in step S103 are added to a(n−1), c(n−1), d(n−1), and f(n−1), such that a(n)=a(n−1)+$\Delta a(n)$. Similarly for the other color displacement components, c(n)=c(n−1)+$\Delta c(n)$, d(n)=d(n−1)+$\Delta d(n)$, and f(n)=f(n−1)+$\Delta f(n)$.

However, the linear component data of the color displacement amount calculated from one set of test patterns may include an error at the time of forming the test patterns or a sensor reading error. Thus, simple addition may result in variations in the calculated color displacement amount due to such errors acting as noise. In order to limit such errors (noise), a product of the change value of the linear component data of the color displacement amount and a predetermined coefficient may be added in order to calculate new linear component data a(n), c(n), d(n), and f(n) of the color displacement amount. In this way, noise components can be smoothed, so that the linear component data of the color displacement amount can be determined with high accuracy. For example, of the linear component data of the color displacement amount, the component a(n) of the overall magnification ratio error in the main scan direction may be calculated by equation 12. The same applies to the other color displacement components c(n), d(n), and f(n).

$$a(n) = a(n-1) + Kp \cdot \Delta a(n) \quad (24)$$

Alternatively, the new linear component data a(n), c(n), d(n), and f(n) of the color displacement amount may be calculated by a so-called proportional integration (PI) type of control. For example, of the linear component data of the color displacement amount, the component a(n) of the overall magnification ratio error in the main scan direction, the following equation 25 may be used for calculation. The same applies to the other color displacement components c(n), d(n), and F(n).

$$a(n)=a(n-1)+Kp\cdot\Delta a(n)+Ki\cdot\Sigma\Delta a(n) \qquad (25)$$

where $\Sigma\Delta a(n)$ is an integrated value of the change value $\Delta a(n)$ of the linear component data of the first through n-th color displacement amounts, Kp is a proportional gain coefficient, and Ki is an integrated gain coefficient. The gain coefficients of Kp and Ki determines a control band by which the high-frequency component noise is limited. Thus, the need for forming plural sets of test patterns and determining their average value can be eliminated, so that the linear component data of the color displacement amount can be sufficiently accurately determined with a set of short test patterns. Further, the linear component data of the color displacement amount can be determined by tracking variations below the control band. Furthermore, because the integrated value of the change value $\Delta a(n)$ of the linear component data of the color displacement amount is also reflected, steady error can also be reduced. In this case, it is only necessary to determine the linear component data of the color displacement amount such that gradual variations due to temperature change and the like can be tracked. Thus, when the sampling period is on the order of several seconds, for example, the control band may be smaller than the sampling period by a factor of several tens or several hundreds, and the values of Kp and Ki may be determined such that such control band can be obtained. When the required control band varies for the elements of the various components a, c, d, and f of the linear component data of the color displacement amount (such as when a particular element is sensitive to temperature change), the values of Kp and Ki may be changed only for the particular element. Preferably, the values of Kp and Ki may be varied for each element so that the control band is different among the elements. In this way, interference of error amount correction among the elements may be prevented.

In step S105, the values of the linear component data of the color displacement amount stored in the storage unit 4 are updated with the new linear component data a(n), c(n), d(n), and f(n) of the color displacement amount detected in step S104. Thereafter, the process returns to step S102, where the next test patterns are generated by using the test pattern data that is corrected based on the color displacement amount characteristics data including the updated linear component data of the color displacement amount.

The above calculations are performed for each of the various colors (C, M, Y).

Thus, by updating the linear component data of the color displacement amount in accordance with the flowchart of FIG. 13, the linear component data of the color displacement amount of the current time is determined at all times by tracking changes over time, and the linear component data of the current time is stored in the linear component data storage unit 4a. Further, the non-linear component data that is changed little by temperature variation is acquired in advance and stored in the non-linear component data storage unit 4b. Thus, the input image data of the normal image is corrected based on the color displacement amount characteristics data including the linear component data to which the non-linear component data is added. Thus, an image can be formed that is corrected for both the linear and non-linear components of the color displacement amount at all times.

Of the components (factors) included in the linear component data of the color displacement amount calculated according to the flowchart of FIG. 13, the registration error components in the main scan direction and the sub-scan direction may be corrected by delaying the main-scan synchronization signal or the sub-scan synchronization signal on a line-by-line basis in the write control unit 5. Thus, of the linear component data of the color displacement amount corresponding to the main-scan-direction registration error and the sub-scan-direction registration error, the integer portion may be output from the updating unit 12 to the write control unit 5, as indicated by a broken line in FIG. 10, in order to perform a delay control of the synchronization signals, and only the fractional portion may remain in the storage unit 4 and may be used for correction by the correcting unit 3.

Method of Calculating and Updating Color Displacement Amount Characteristics Data Example 2

Figure 14:
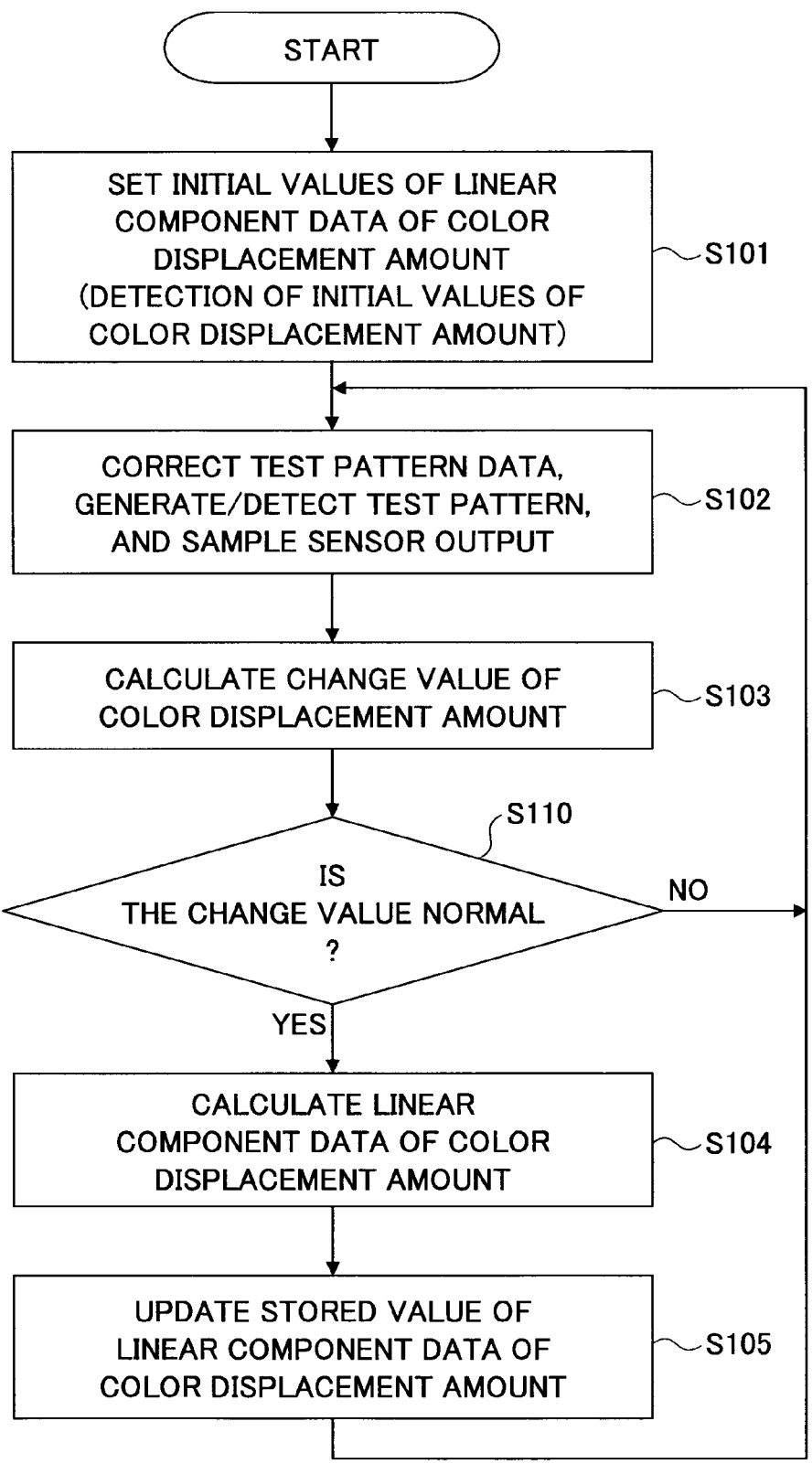
FIG. 14 is a flowchart of another method of calculating and updating the color displacement amount characteristics data (linear component data)

FIG. 14 is a flowchart of another method of calculating and updating the color displacement amount characteristics data in the updating unit 12. The flowchart of FIG. 14 differs from that of FIG. 13 in that step S110 is added. The steps of FIG. 14 similar to those of FIG. 13 are designated with similar step numbers and their redundant description is omitted.

In step S110, it is determined whether the change values $\Delta a(n)$, $\Delta c(n)$, $\Delta d(n)$, and $\Delta f(n)$ of the linear component data of the color displacement amount calculated in step S103 is within a predetermined range. When the change values $\Delta a(n)$, $\Delta c(n)$, $\Delta d(n)$, and $\Delta f(n)$ are in the predetermined range, the process goes on to step S104. If any of the change values is not within the predetermined range, the change value outside the predetermined range is treated as a detection error, and the process returns to step S102 without reflecting the erroneous change value in the calculations according to equation 20 or adding the erroneous change value to the integrated value. For example, when there is a scratch on the intermediate transfer belt 8, the output from the detecting unit (sensor) 11 may exhibit an abnormal value upon passing near the scratch. If the scratch happens to be located near where the test pattern is formed, the calculated change value of the linear component data of the color displacement amount may differ from its actual value. In such a case, the abnormal change value is prevented from being reflected in the calculations of the color displacement amount in step S110. Thus, disturbance of the control system by the abnormal value can be prevented, and the linear component data of the color displacement amount can be obtained stably.

According to the present embodiment, as described above, the amount of change of the linear component data of the color displacement amount is detected at regular intervals. Because the amount of change of the color displacement amount in the short time during the detection at regular intervals is not normally large, an abnormal value such as one due to a scratch can be easily detected by setting the abnormality determination value at a small value (such as on the order of several ten microns).

If an abnormal value is detected in any one of the plural elements (factors) in the linear component data of the color displacement amount due to a scratch and the like, the other elements may also be affected, thus preventing normal detection of the amount of change of the color displacement amount. Thus, upon detection of an abnormal value in any one of the elements (factors), no calculation or update may be performed for the other elements.

(Print Job Start Instruction Control)

In accordance with the present embodiment, the print job control unit 13 may control a print job start instruction according to the flowchart of FIG. 13 as described above.

Further, in accordance with the present embodiment, the functions of the main control unit 16, the updating unit 12, the storage unit 4, and the print job control unit 13 may be realized by executing a predetermined program and the like in the hardware configuration of FIG. 14 as described above. The correction by the correcting unit 3 based on the color displacement amount characteristics data (linear component data and non-linear component data) may be performed via the I/O port 105. The CPU 102, as an operating/processing unit, may exchange an input or output with the outside via the I/O port 105, calculate color displacement amount characteristics data (linear component data and non-linear component data), or perform a print job start control. The CPU 102 may be connected to the RAM 103 and the ROM 104 via the memory bus 106.

When the non-linear component data of the color displacement amount is acquired by an external image reading apparatus, the acquired non-linear component data may be received via the I/O port 105 and then set or stored in the non-linear component data storage unit 4b via the I/O port 105. Alternatively, image data obtained by reading the test chart for acquiring the non-linear characteristics of the color displacement amount (either as is or after processing) may be obtained via the I/O port 105, converted by the CPU 102 into non-linear component data of the color displacement amount as described above, and then the non-linear component data may be set or stored in the non-linear component data storage unit 4b.

The ROM 104 may store various programs, such as a program for calculating the color displacement amount characteristics data (linear component data and non-linear component data).

According to Embodiment 3, of the linear component data and non-linear component data of the color displacement amount stored in the storage unit 4, only the linear component data stored in the linear component data storage unit 4a is the subject of updating. Preferably, only the non-linear component data stored in the non-linear component data storage unit 4b may be selected as the subject of updating. In this case, the updating unit 12 may detect the amount of change of the non-linear component of the color displacement amount based on the result of detection of the test pattern by the detecting unit 11, and then calculate new non-linear component data based on the amount of change of the non-linear component and the non-linear component data stored in the non-linear component data storage unit 4b. Then, the updating unit 12 may update the non-linear component data stored in the non-linear component data storage unit 4b with the new non-linear component data (see the arrow with a dashed-dotted line extending from the updating unit 12 in FIG. 10).

Preferably, both the linear component data in the linear component data storage unit 4a and the non-linear component data in the non-linear component data storage unit 4b may be selected as the subject of updating. In this case, the updating unit 12 may detect the amount of change of the linear component based on the result of detection by the detecting unit 11, calculate new linear component data based on the amount of change of the linear component and the linear component data in the linear component data storage unit 4a, and then update the linear component data storage unit 4a with the new linear component data (see the arrow with a solid line extending from the updating unit 12 in FIG. 10). Further, the updating unit 12, based on the result of detection of the test pattern by the detecting unit 11, may detect the amount of change of the non-linear component of the color displacement amount, calculate new non-linear component data based on the amount of change of the non-linear component and the non-linear component data in the non-linear component data storage unit 4b, and then update the data in the non-linear component data storage unit 4b with the new non-linear component data (see the arrow with the dashed-dotted line in FIG. 10).

Embodiment 4

An image forming apparatus according to Embodiment 4 may be suitable in a case where the linear characteristics factors of the color displacement amount ($\alpha 0$, $\alpha 1$, $\beta 0$, and $\beta 1$ in equations 13 and 14) have large amounts of change with respect to temperature changes over time, and where also the non-linear characteristics factors of the color displacement amount (f(x) and g(x) of equations 13 and 14) have large amounts of change with respect to temperature changes over time.

Figure 15:
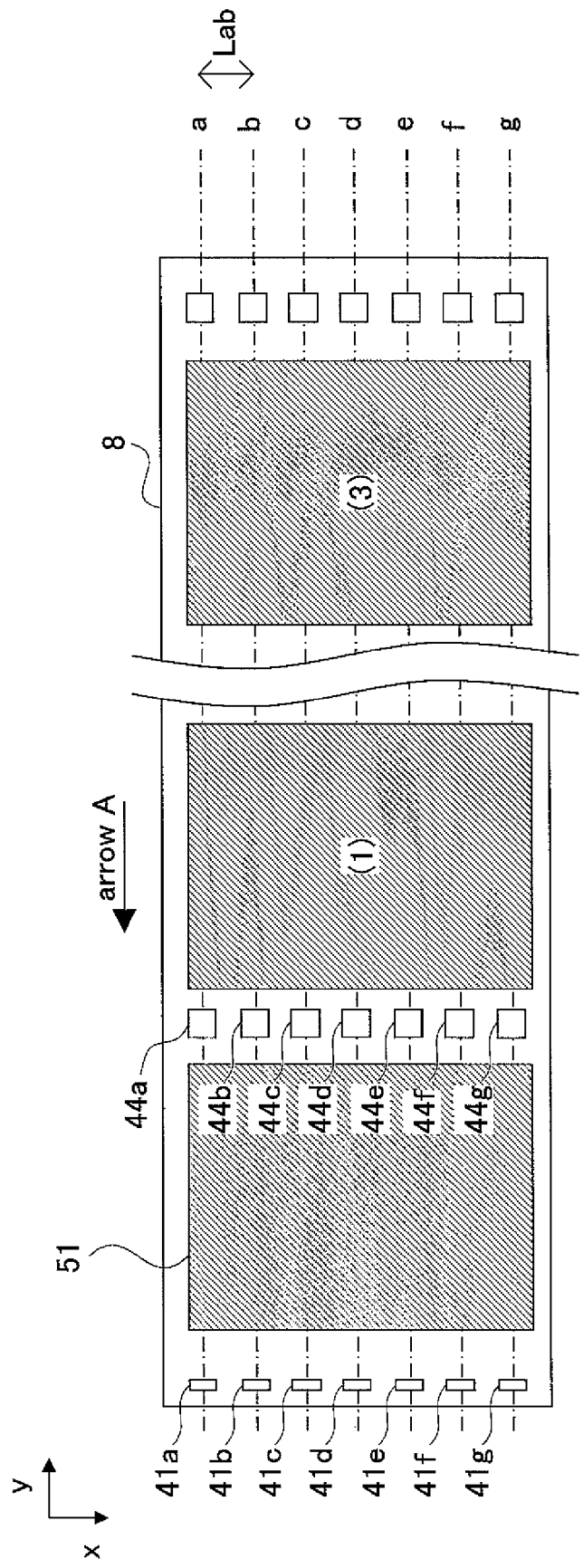
FIG. 15 is a plan view of an intermediate transfer belt of the image forming apparatus according to an embodiment.

The image forming apparatus according to Embodiment 4 may have a configuration similar to the one illustrated in FIG. 1. The image forming apparatus according to Embodiment 4 differs from Embodiment 3 in that four or more detecting units 41 are disposed in the main scan direction, as illustrated in FIG. 15. In this way, the color displacement amount can be detected at more locations in the main scan direction, so that changes in the non-linear characteristics over time due to temperature variations and the like can be detected at all times, as will be described below. The image forming apparatus according to Embodiment 4 also differs in that an updating unit 42 calculates the color displacement amount characteristics data including the non-linear characteristics component, and that a storage unit 43 stores the color displacement amount characteristics data including the non-linear characteristics component. Other elements or parts similar to those of Embodiment 1 are designated with similar reference numerals and their redundant description is omitted.

FIG. 15 is a plan view of the intermediate transfer belt 8 according to the present embodiment as seen from above in an orthogonal direction. FIG. 15 also illustrates an example of the positional relationships among images, test patterns, and sensors. In FIG. 15, the moving direction (direction of arrow A) of the intermediate transfer belt 8 corresponds to the sub-scan direction (y-axis direction), and a direction perpendicular to the sub-scan direction corresponds to the main scan direction (x-axis direction). Thus, in the example of FIG. 13, the intermediate transfer belt 8 is moved in the negative direction in the Y axis.

An area 51 with hatching in FIG. 15 is an image forming area in which plural images with different colors are superposed upon one another, forming an output image. The numbers in parentheses "(1)" through "(3)" attached to the image forming areas are serial numbers of the image forming areas in which images are successively formed on the intermediate transfer belt 8, corresponding to the image print jobs described above. In FIG. 15, seven detecting units 41a through 41g are disposed in a row in the main scan direction. Test patterns are formed in test pattern forming areas 44a through 44g arranged in the main scan direction, whose positions correspond to the positions of the detecting units 42a through 42g (on the dashed-dotted lines a through g), respectively. The test pattern forming areas 44a through 44g are located in a region ("sheet gap") outside the image forming areas and between adjacent image forming areas 51 in the sub-scan direction. The test patterns may be disposed at predetermined intervals in the sub-scan direction, such as at intervals of a predetermined number of images; namely, in the sheet gaps between plural image forming areas 51 that are successively set in the surface moving direction of the intermediate transfer belt 8. As in the case of Embodiment 3, the predetermined intervals may not strictly correspond to a constant distance. Preferably, the print jobs may be controlled such that the test patterns can be inserted in the sheet gaps at approximately predetermined intervals.

The structure and function of the detecting units 41a through 41g may be similar to those of FIG. 5, and also the structure and function of the test patterns may be similar to those of FIG. 4. Thus, their detailed description is omitted.

Figure 16:
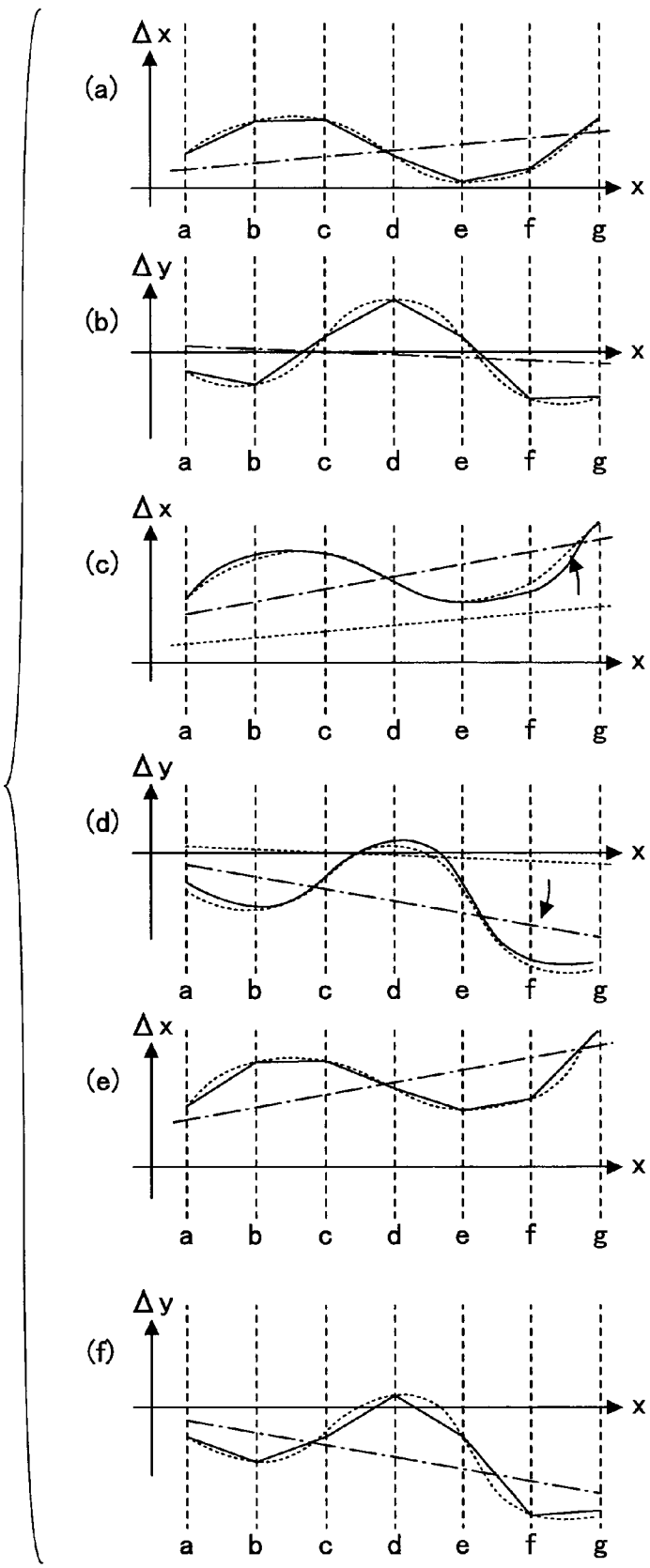
FIGS. 16(a) through 16(f) are graphs illustrating displacement characteristics of an image.

FIGS. 16(*a*) through 16(*f*) are graphs illustrating the displacement characteristics of an image in the main and sub-scan directions according to Embodiment 4. The dotted lines indicate displacement characteristics Δx in the main scan direction and displacement characteristics Δy in the sub-scan direction with respect to a main scan position x at a given point in time.

The solid lines in FIGS. 16(*c*) and 16(*d*) indicate the displacement characteristics Δx in the main scan direction and the displacement characteristics Δy in the sub-scan direction with respect to the main scan position x in a temperature-varied state after a time. The dotted lines indicate the characteristics where the linear component is changed as in Embodiment 3 but the non-linear characteristics component is not changed. The difference between the dotted line and the solid line corresponds to a change in the non-linear characteristics component of the color displacement amount.

As in the case of Embodiment 3, the characteristics of the color displacement amount may be divided into plural regions in the main scan direction for broken line approximation, a color displacement transform matrix may be determined for each of the regions, and coordinate transform may be performed in accordance with the color displacement transform matrix. The boundaries of the regions may coincide with the positions of the detecting units 41a through 41g. Because seven detecting units 41 are disposed, there are illustrated six regions. While in Embodiment 3 only the non-linear characteristics component have been expressed by broken line approximation lines, linear characteristics factors may also be expressed by broken line approximation in Embodiment 4. Such broken line approximation lines are illustrated in FIGS. 16(*a*), 16(*b*), 16(*e*), and 16(*f*). The dotted lines in FIGS. 16(*e*) and 16(*f*) are identical to the solid lines of FIGS. 16(*c*) and 16(*d*), respectively.

The correcting unit 3, as in Embodiment 3, may determine the color displacement transform matrix A in equations 19 and 20 for each of the regions divided in the main scan direction, and perform coordinate transform by determining an inverted matrix of the transform matrix A for each region. In this way, color displacement factors that exhibit non-linear characteristics, such as scan curving (bowing) or main-scan partial magnification ratio deviation, can be accurately corrected.

When each region has a color displacement transform matrix Ai and the elements of the matrix are defined according to equation 22, the elements of the matrix can be determined as follows. Depending on the main scan coordinate x of the image to be transformed, the color displacement transform matrix Ai of the corresponding region is selected, and then coordinate transform is performed by its inverted matrix.

Next, a method for calculating the elements of the color displacement transform matrix for region a-b in FIG. 16 is described. The structure of the test pattern for detecting the color displacement, and the structure of the detecting unit for detecting the test pattern may be the same as those of Embodiment 3. Thus, signs and the like are defined in the same way as described above. However, signs or references indicating the positions of some of the detecting units may be varied as needed. The distances measured at the positions a through g of the detecting units 41a through 41g are differentiated by adding suffixes "_a" through "_g". The distance between adjacent sensor positions is indicated by "Lab". While the following description is concerned with the displacement of cyan C with respect to black (K), the same manner of description also applies to the other colors. When the measured distances are defined as described above, the calculation equations for the elements (components of the color displacement amount) of the color displacement transform matrix for region a-b may be expressed by the following four equations.

Skew error: $d1(C)=(L1c\_b-L1c\_a)/Lab$

Sub-scan-direction registration error: $f1(C)=(L1c\_a-L1\text{ref})\cdot\kappa$

Main-scan-direction partial magnification ratio error:
$a1(C)=((L2c\_b-L2k\_b)-(L2c\_a-L2k\_a))/Lab$ Main-scan-direction registration error: $c1(C)=L2k\_a\cdot\kappa$ The color displacement transform matrix for subsequent regions may be similarly calculated. Offsets may be corrected as needed so that continuity can be maintained at the region boundaries. The color displacement transform matrixes for the regions at both ends have a skew error element d=0, and a partial magnification ratio error element in the main scan direction a=1 (namely, a'=0), where the registration error elements in the main and sub-scan directions are determined such that continuity with the adjacent regions can be maintained.

By thus calculating, the color displacement transform matrix can be determined for each region. By correcting an image based on the color displacement transform matrix, the color displacement factors that exhibit non-linear characteristics, such as scan curving (bowing) or a main-scan partial magnification ratio deviation, can be accurately corrected.

Figure 17:
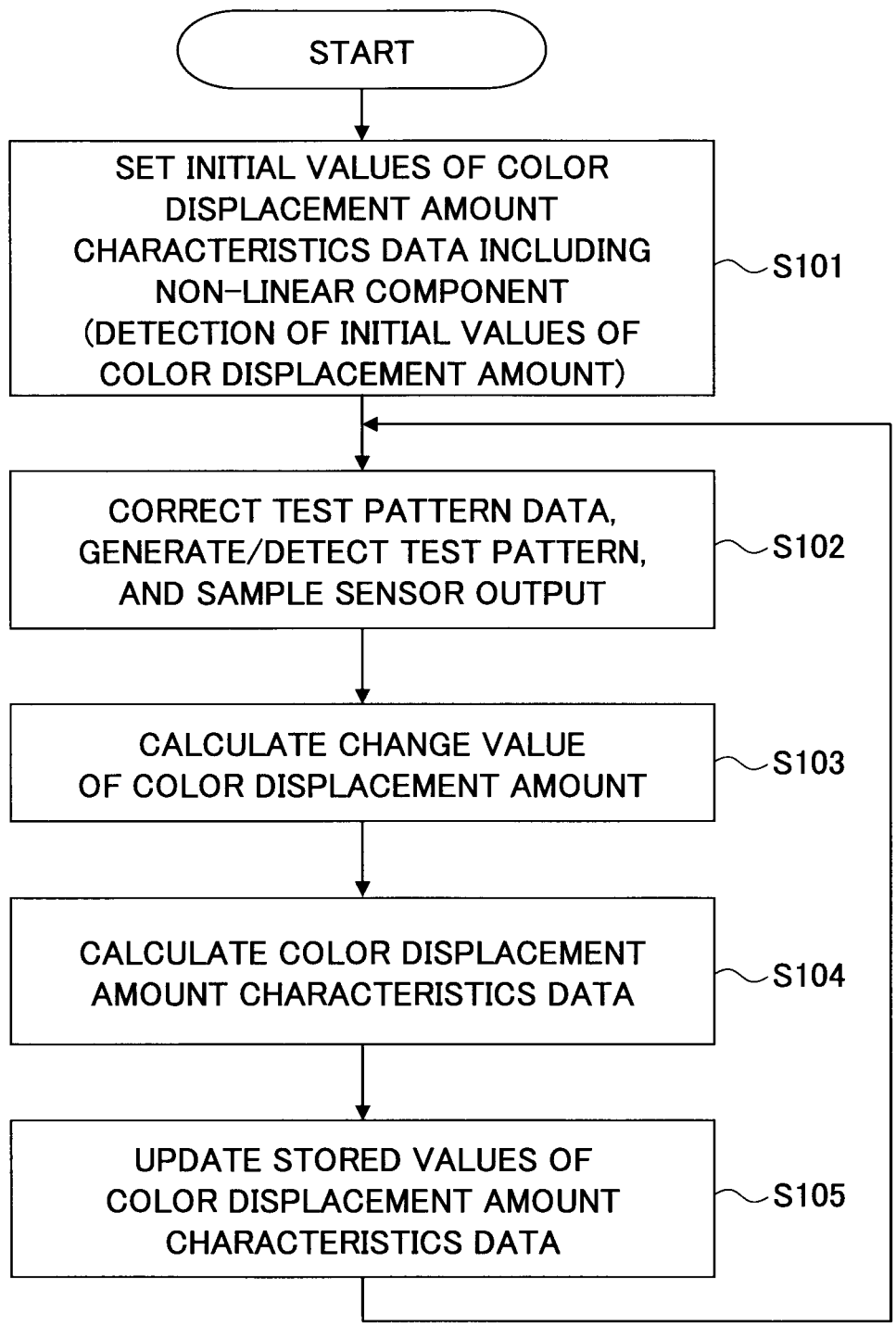
FIG. 17 is a flowchart of a method of calculating and updating color displacement amount characteristics data.

FIG. 17 is a flowchart of a method of calculating and updating the color displacement amount characteristics data in the updating unit 42 according to Embodiment 4. As described above, the color displacement characteristics of each region, i.e., the color displacement transform matrix for each region, are changed by temperature variation. Thus, as in the flowchart of FIG. 13, the updating unit 42 calculates the color displacement amount characteristics data. In the following, the differences of the steps of the process of FIG. 17 from those of FIG. 13 are described.

In step S101, initial values of the color displacement amount characteristics data indicating the color displacement amount characteristics are set for each region. The initial values may be calculated in the same way as described above.

In step S102, by referring to the color displacement amount characteristics data that is stored for each region as described above, a color displacement correcting matrix for an inverse transform is determined. Then, the test pattern corrected in accordance with the color displacement correcting matrix is created, and the sensor output from the detecting unit detecting the test pattern is sampled.

In step S103, from the sensor output sampled in step S102, the color displacement amount is calculated according to equation 25. The sensor output sampled in step S102 has been corrected in accordance with the color displacement amount characteristics data stored in the storage unit 4. Thus, the color displacement amount characteristics data calculated in this step corresponds to the change component from the color displacement amount characteristics data stored in the storage unit 4. The change component of the non-linear characteristics of the color displacement amount is also detected as a displacement of each element in reach region.

In step S104, new color displacement amount characteristics data is calculated from the change value of the color displacement amount characteristics data calculated in step S103. Similar calculations are performed for each region. Noise may also be reduced as described above.

In step S105, the values of the color displacement amount characteristics data stored in the storage unit 4 are updated with the new color displacement amount characteristics data determined in step S104. Thereafter, the process returns to step S102, where the test pattern data used for creating the next test pattern is corrected based on the updated color displacement amount characteristics data.

By thus updating the color displacement amount characteristics data of each region, when the color displacement characteristics data include the non-linear characteristics such as scan curving (bowing) or the main-scan partial magnification ratio deviation, and when such characteristics are changed over time by temperature variation and the like, the latest color displacement amount characteristics data can be determined by tracking such changes and stored in the storage unit 4 at all times. Based on the thus updated color displacement amount characteristics data, the normal image is corrected. Thus, a high-quality image in which color displacements including non-linear components are corrected can be stably formed at all times.

Figure 18:
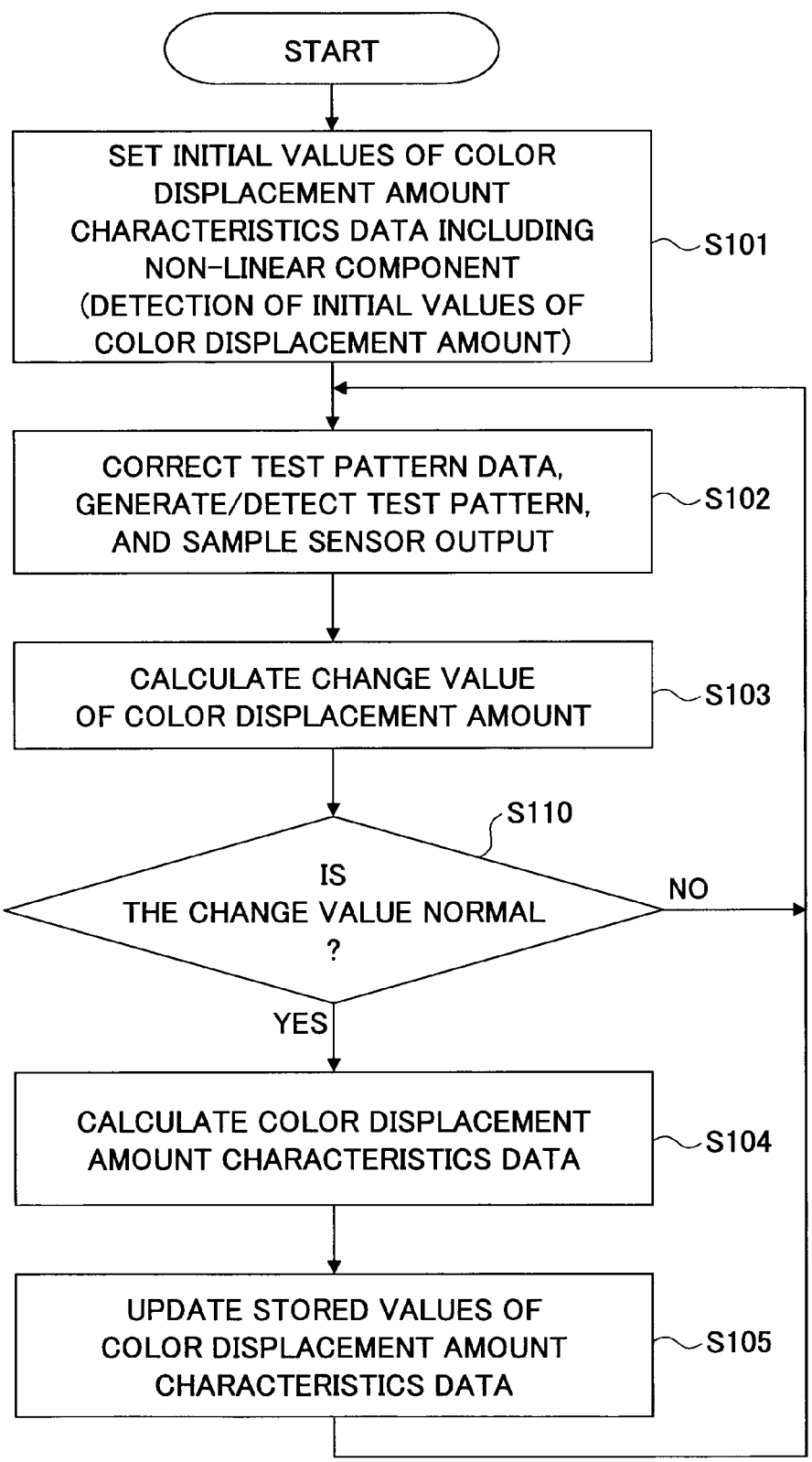
FIG. 18 is a flowchart of another method of calculating and updating the color displacement amount characteristics data.
Figure 19:
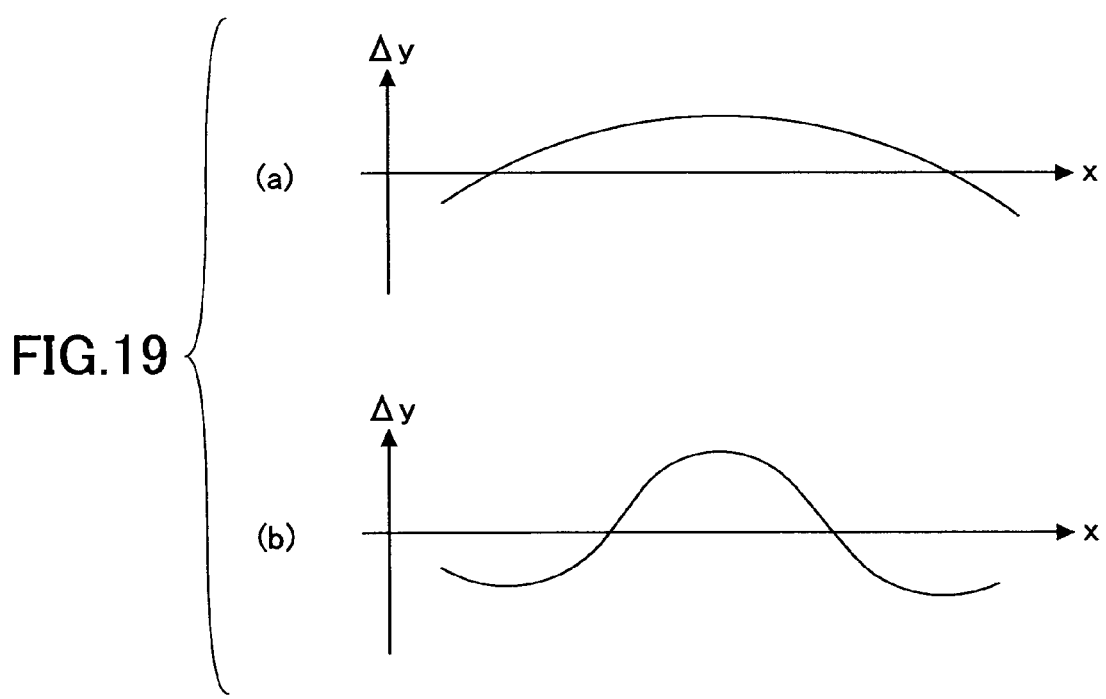
FIG. 19(a) illustrates an example of a non-linear color displacement component in the main scan direction referred to as "scan curving" or "bowing"
FIG. 19(b) illustrates an example of a curving color displacement characteristics having a high-order (third-order and higher) component in the main scan direction.

FIG. 18 is a flowchart of another method for calculating and updating the color displacement amount characteristics data in the updating unit 42. In step S110 of FIG. 18, if the change value of the color displacement amount characteristics data calculated in step S103 is outside a predetermined range in any one of the region, a detection error is recognized and the process returns to step S102 without reflecting the change value of the color displacement amount characteristics data in the calculation of the color displacement characteristics data, or adding to the integrated value. Thus, an abnormal value due to a scratch and the like can be readily determined, so that the color displacement amount characteristics data can be accurately calculated.

Embodiment 5

The variation characteristics of the non-linear characteristics may differ between a displacement in the main scan direction and a displacement in the sub-scan direction. Thus, Embodiments 3 and 4 may be combined. Namely, when there is little change over time in the displacement in the main scan direction (main-scan partial magnification ratio deviation) but there is a change over time in the displacement in the sub-scan direction (scan curving), the components a and c of the elements of the color displacement transform matrix of each region that are related to displacements in the main scan direction may be determined according to Embodiment 3, while the components d and f that are related to displacements in the sub-scan direction may be determined according to Embodiment 4. Conversely, the components a and c related to displacements in the main scan direction may be determined according to Embodiment 4 while determining the components d and f related to displacements in the sub-scan direction according to Embodiment 3. By thus combining Embodiments 3 and 4 when the variation characteristics of the non-linear characteristics are varied between displacements in the main-scan and sub-scan directions, the color displacement amount characteristics data can be calculated and update in a manner suitable for the variation characteristics in each direction.

Thus, in accordance with Embodiments 3 through 5, the linear component data and non-linear component data of the color displacement amount used for color displacement correction are separately stored, and the input image data and test pattern data are corrected based on the linear component data and non-linear component data. Based on the thus corrected input image data, plural images are formed and superposed upon one another on the intermediate transfer belt 8. In this way, an output image can be formed in which the non-linear component as well as the linear component of the color displacement is corrected. Further, based on the test pattern data corrected according to the linear component data and non-linear component data, a test pattern is formed on the intermediate transfer belt 8. In this way, the test pattern can be formed in which not only the linear component but also the non-linear component of the color displacement is corrected. Further, at least one of the linear component data and the non-linear component data of the stored color displacement amount is updated based on a detection result of the test pattern. Thus, when at least one of the linear component and the non-linear component of the color displacement amount is changed over time, at least one of the linear component data and the non-linear component data that is used for correcting the input image data and test pattern data can be changed in accordance with the change in the linear component and the non-linear component. The output image and the test pattern can be formed based on at least one of the linear component data and the non-linear component data that is changed. Thus, when at least one of the linear component and the non-linear component of the color displacement amount is changed, a decrease in accuracy of correction of the input image data and test pattern data based on the linear component and non-linear component of the color displacement amount can be prevented. Thus, a high-quality output image in which not only the linear component but also the non-linear component of the color displacement is accurately corrected can be formed.

In accordance with Embodiments 3 through 5, of the linear component data and non-linear component data of the color displacement amount stored in the storage unit 4, only the linear component data may be updated. Specifically, the updating unit 12, based on the result of detection of the test pattern by the detecting unit 11, may detect the amount of change of the linear component of the color displacement amount, and calculate new linear component data based on the change amount and the linear component data stored in the storage unit 4. Then, the linear component data stored in the storage unit 4 may be updated with the new linear component data. By thus updating the linear component data, when the linear component of the color displacement is changed over time, the linear component data used for correcting the input image data and test pattern data can be changed in accordance with the change. Because an output image and test patterns can be formed based on the thus changed linear component data, the decrease in correction accuracy of the input image data and test pattern data based on the linear component of the color displacement can be prevented when the linear component of the color displacement is changed.

In accordance with Embodiments 3 through 5, of the linear component data and non-linear component data of the color displacement amount stored in the storage unit 4, only the non-linear component data may be updated. Specifically, the updating unit 12, based on the result for detection of the test pattern by the detecting unit 11 may detect the amount of change of the non-linear component of the color displacement amount, and calculate new non-linear component data based on the amount of change of the non-linear component of the color displacement amount and the non-linear component data stored in the storage unit 4. Then, the non-linear component data stored in the storage unit 4 may be updated with the new non-linear component data. By thus updating the non-linear component data, when the non-linear component of the color displacement amount is changed over time, the non-linear component data used for correcting the input image data and test pattern data can be changed in accordance with the change. Because the output image and test patterns can be formed based on the thus changed non-linear component data, the decrease in accuracy of correction of the input image data and test pattern data based on the non-linear component of the color displacement amount can be prevented when the non-linear component of the color displacement amount is changed.

In accordance with Embodiments 3 through 5, both the linear component data and non-linear component data of the color displacement amount stored in the storage unit 4 may be updated. Specifically, the updating unit 12, based on the result of detection of the test pattern by the detecting unit 11, may detect the amount of change of the linear component of the color displacement amount, and calculate new linear component data based on the amount of change of the linear component of the color displacement amount and the linear component data stored in the storage unit 4. Then, the updating unit 12 may update the linear component data stored in the storage unit 4 with the new linear component data. Further, the updating unit 12 may detect the amount of change of the non-linear component of the color displacement amount based on the result of detection of the test pattern by the detecting unit 11, calculate new non-linear component data based on the amount of change of the non-linear component and the non-linear component data stored in the storage unit 4, and then update the non-linear component data stored in the storage unit 4 with the new non-linear component data. By thus updating both the linear component data and the non-linear component data, when the linear component and non-linear component of the color displacement amount are changed over time, the linear component data and non-linear component data used for correcting the input image data and test pattern data can be changed in accordance with the detected changed. Because the output image and test patterns can be formed based on the thus changed linear component data and non-linear component data, the decrease in accuracy of correction of the input image data test pattern data based on both the linear component and non-linear component of the color displacement amount can be prevented when both the linear component and non-linear component of the color displacement amount are changed.

In accordance with Embodiments 3 through 5, the calculations performed by the updating unit 12 may include summing the change amount and the linear component data or non-linear component data corresponding to the amount of change. Thus, the process of correcting the input image data and test pattern data can be simplified.

In accordance with Embodiments 3 through 5, the calculations performed by the updating unit 12 may include summing a product of the change amount and a predetermined coefficient and the linear component data or the non-linear component data corresponding to the amount of change. Thus, when there is error or noise in the detection result from the detecting unit 11, variations in the newly calculated linear component data or non-linear component data can be prevented and a decrease in accuracy can be prevented.

In accordance with Embodiments 3 through 5, the calculations performed by the updating unit 12 may include summing a product of the amount of change and a predetermined first coefficient, a product of an integrated value of the amount of change and a predetermined second coefficient, and the linear component data or the non-linear component data corresponding to the amount of change. Thus, when there is a steady error or a high-frequency noise in the detection result from the detecting unit 11, variations in the newly calculated linear component data or non-linear component data can be prevented, and a decrease in accuracy can be prevented.

In accordance with Embodiments 3 through 5, the updating unit 12 may perform the summing for each of multiple types of factors causing the color displacement amount, using different coefficients for the multiple types of factors. Thus, when the error or noise is caused differently in the detection result from the detecting unit 11 depending on the types of factors of the color displacement amount, the variations in the newly calculated linear component data or non-linear component data can be prevented and the decrease in accuracy can be reliably prevented.

In accordance with Embodiments 3 through 5, the updating unit 12 may not perform the calculations and updating when the amount of change is not within a predetermined range. Thus, when the detection result from the detecting unit 11 exhibits an abnormal value due to a scratch and the like on the intermediate transfer belt 8, the decrease in accuracy when updating the linear component data or non-linear component data due to the influence of the abnormal value can be prevented.

In accordance with Embodiments 3 through 5, the updating unit 12 may detect the amount of change for each of the multiple types of factors of the color displacement amount. When the amount of change of at least one of the multiple types of factors is not within the predetermined range, the updating unit 12 may not perform the calculations and updating of the amount of change of the multiple types of factors. Thus, when the abnormal value in the detection result that is detected in any one of the multiple types of factors affects the other factors, the decrease in accuracy of updating of the linear component data or non-linear component data with regard to all of the multiple types of factors can be prevented.

In accordance with Embodiments 3 through 5, when the linear component of the color displacement amount including at least one of a skew error, a main-scan-direction magnification ratio error, a main-scan-direction registration error, and a sub-scan-direction registration error is changed over time, the decrease in accuracy of correction of the input image data and test pattern data based on the linear component of the color displacement amount can be prevented.

In accordance with Embodiments 3 through 5, when the non-linear component of the color displacement amount including at least one of components of a displacement due to curving in the main scan direction and a displacement due to a main-scan-direction partial magnification ratio deviation is changed over time, the decrease in accuracy of correction of the input image data and test pattern data based on the non-linear component of the color displacement amount can be prevented.

In accordance with Embodiments 3 through 5, the non-linear component data stored in the storage unit 4 includes plural items of non-linear component data each corresponding to the difference from the linear component data for each of plural regions divided in the main scan direction. The correcting unit 3 corrects the input image data and test pattern data based on a sum value of the linear component data stored in the storage unit 4 and the non-linear component data for each of the plural regions. Thus, the correcting unit 3 can perform broken line approximation with regard to the non-linear characteristics of the color displacement amount for each region. Thus, the decrease in accuracy can be prevented while simplifying the calculations of the non-linear component data.

In accordance with Embodiments 3 through 5, the correcting unit 3 may correct the input image data and test pattern data by performing coordinate transform based on the sum values for each of the plural regions. Thus, a color displacement factor exhibiting non-linear characteristics can be accurately corrected.

In accordance with the foregoing embodiments (Embodiment 4), the input image data and test pattern data are corrected based on the color displacement amount characteristics data stored in the storage unit 43 that include the non-linear component. Based on the thus corrected test pattern data, plural test patterns are formed on the intermediate transfer belt 8 in the main scan direction. Based on detection results from plural detecting units that detect the plural test patterns, the amounts of change of the color displacement amount at the detection positions of the detecting units are detected. New color displacement amount characteristics data are calculated based on the detected amounts of change of the color displacement amount and the color displacement amount characteristics data stored in the storage unit 43. Then, the color displacement amount characteristics data stored in the storage unit 43 are updated with the new color displacement amount characteristics data. By thus updating the color displacement amount characteristics data having the non-linear component, when the non-linear component of the color displacement amount is changed over time, the color displacement amount characteristics data used for correcting the input image data and test pattern data can be changed in accordance with the change in the non-linear component. Thus, the output image and test patterns can be formed based on the thus changed color displacement amount characteristics data, so that, when the non-linear component of the color displacement amount is changed over time, the decrease in accuracy of correction of the input image data test pattern data based on the non-linear component of the color displacement amount can be prevented. Thus, a high-quality output image in which not only the linear component but also the non-linear component of the color displacement is accurately corrected can be formed.

In accordance with the foregoing embodiments (Embodiment 4), the color displacement amount characteristics data stored in the storage unit 43 include plural items of color displacement amount characteristics data of plural regions divided in the main scan direction whose boundaries correspond to the detection positions of the plural detecting units 41. The updating unit 42, based on the detection results from the plural detecting units, detects the amount of change of the color displacement amount in each of the plural regions, and calculates new color displacement amount characteristics data based on the amount of change of the color displacement amount and the color displacement amount characteristics data of each region stored in the storage unit 43. Then, the updating unit updates the color displacement amount characteristics data stored in the storage unit 43 with the new color displacement amount characteristics data. Thus, broken line approximation of the non-linear characteristics of the color displacement amount can be performed in each of the plural regions divided in the main scan direction. In this way, the decrease in accuracy can be prevented while simplifying the calculation of the color displacement amount characteristics data including the non-linear component.

In accordance with the foregoing embodiments (Embodiment 4), the calculations by the updating unit 42 include summing of a product of the amount of change of the color displacement amount and a predetermined first coefficient, a product of an integrated value of the amount of change of the color displacement amount and a predetermined second coefficient, and the color displacement amount characteristics data stored in the storage unit 43. Thus, when there is a steady error or high-frequency noise in the detection result from the detecting unit 41, variations in the newly calculated color displacement amount characteristics data can be prevented and the decrease in accuracy can be prevented.

In accordance with the foregoing embodiment (Embodiment 4), the updating unit 42, when the amount of change of the color displacement amount is not within a predetermined range, does not perform the calculations and updating. Thus, when the detection result from the detecting unit 41 includes an abnormal value due to a scratch and the like on the intermediate transfer belt 8, the decrease in accuracy when updating the color displacement amount characteristics data due to the influence of the abnormal value can be prevented.

Further, in accordance with the foregoing embodiments (Embodiment 4), the updating unit 43 detects the amount of change of the color displacement amount for each of multiple types of factors causing the color displacement amount. When the amount of change of the color displacement amount of at least one of the multiple types of factors is not within the predetermined range, the updating unit does not perform the calculations and updating of the amount of change of the color displacement amount for the multiple types of factors. In this way, when the abnormal value of the detection result from the detecting unit 41 caused in any one of the multiple types of factors affects the other factors, the decrease in accuracy of updating the color displacement amount characteristics data for all of the multiple types of factors can be prevented.

In accordance with the foregoing embodiments (Embodiment 4), in a period of executing a normal image forming job, the test pattern is formed outside an output image forming area on the intermediate transfer belt 8. Thus, the test pattern can be formed without interrupting the normal image forming job. In addition, there is no need for executing a job exclusively for forming only the test pattern separately from the normal image forming job.

In accordance with the foregoing embodiments, the test patterns are formed at predetermined time intervals or in gaps between a predetermined number of image forming areas successively formed on the intermediate transfer belt 8. Thus, the color displacement amount characteristics data that may be changed over time can be updated at regular intervals, so that the change in the color displacement amount of the normal image or test patterns over time can be more reliably corrected.

The foregoing embodiments have been described as being applied to the image forming apparatus of the intermediate transfer type in which plural images formed on each of plural photosensitive bodies are superposed on the intermediate transfer belt in order to form a color output image. However, an embodiment of the present invention may be applied to an image forming apparatus of the direct transfer type in which plural images formed on plural photosensitive bodies are transferred onto a recording sheet in a superposed manner without using an intermediate transfer belt, while the recording sheet is being transported by a transport belt (transport member), whereby a color output image is formed on the recording sheet. In this case, a test pattern may be formed on the transport belt that transports the recording sheet. The test pattern may be formed in a sheet gap region outside the region in which the recording sheet is retained on the transport belt.

Although this invention has been described in detail with reference to certain embodiments, variations and modifications exist within the scope and spirit of the invention as described and defined in the following claims.

The present application is based on Japanese Priority Applications No. 2010-206520 filed Sep. 15, 2010 and No. 2010-266091 filed Nov. 30, 2010, the entire contents of which are hereby incorporated by reference.

The invention claimed is:

1. An image forming apparatus comprising:
an intermediate transfer body;
a generating unit configured to generate test pattern data;
a storage unit configured to store a color displacement amount;
a correcting unit configured to correct the test pattern data and image data based on the color displacement amount currently stored in the storage unit;
a forming unit configured to form a test pattern based on the test pattern data corrected by the correcting unit on the intermediate transfer body at predetermined intervals, and configured to form an image based on the image data corrected by the correcting unit on the intermediate transfer body;
a detecting unit configured to detect the test pattern formed on the intermediate transfer body; and
an updating unit configured to obtain an amount of change of a color displacement amount from a detection result of the detecting unit, and add a product of the obtained amount of change of the color displacement amount and a first coefficient, with the color displacement amount stored in the storage unit.

2. The image forming apparatus according to claim 1, wherein the storage unit stores linear component data and non-linear component data of the color displacement amount used for color displacement correction separately,
wherein the correcting unit corrects the test pattern data and image data based on the linear component data and non-linear component data stored in the storage unit,
wherein the forming unit includes an output image forming unit and a test pattern forming unit,
the output image forming unit forming a plurality of images of different colors based on the image data corrected by the correcting unit, and forming an output image by superposing the plurality of images on the intermediate transfer body or a recording medium,
the test pattern forming unit forming the test pattern on the intermediate transfer body or a transport member that retains and transports the recording medium, based on the test pattern data corrected by the correcting unit,
the detecting unit detecting the test pattern formed by the test pattern forming unit,
wherein the updating unit updates at least one of the linear component data and non-linear component data of the color displacement amount stored in the storage unit, based on the result of detection by the detecting unit.

3. The image forming apparatus according to claim 2, wherein, of the linear component data and non-linear component data of the color displacement amount stored in the storage unit, only the linear component data is updated,
wherein the updating unit detects an amount of change of the linear component data of the color displacement amount based on the result of detection by the detecting unit, calculates new linear component data based on the amount of change of the linear component of the color displacement amount and the linear component data stored in the storage unit, and updates the linear component data stored in the storage unit with the new linear component data.

4. The image forming apparatus according to claim 2, wherein, of the linear component data and non-linear component data of the color displacement amount stored in the storage unit, only the non-linear component data is updated,
wherein the updating unit detects an amount of change of the non-linear component data of the color displacement amount based on the result of detection by the detecting unit, calculates new non-linear component data based on the amount of change of the linear component of the color displacement amount and the non-linear component data stored in the storage unit, and updates the non-linear component data stored in the storage unit with the new non-linear component data.

5. The image forming apparatus according to claim 2, wherein both the linear component data and non-linear component data of the color displacement amount stored in the storage unit are updated,
wherein the updating unit detects an amount of change of the linear component data of the color displacement amount based on the result of detection by the detecting unit, calculates new linear component data based on the amount of change of the linear component of the color displacement amount and the linear component data stored in the storage unit, and updates the linear component data stored in the storage unit with the new linear component data, and
wherein the updating unit also detects an amount of change of the non-linear component data of the color displacement amount based on the result of detection by the detecting unit, calculates new non-linear component data based on the amount of change of the non-linear component of the color displacement amount and the non-linear component data stored in the storage unit, and updates the non-linear component data stored in the storage unit with the new non-linear component data.

6. The image forming apparatus according to claim 2, wherein the non-linear component of the color displacement amount includes at least one of a displacement component due to curving in a main-scan direction and a displacement component due to a partial magnification error in the main-scan direction.

7. The image forming apparatus according to claim 2, wherein the non-linear component data stored in the storage unit includes a plurality of items of non-linear component data of differences from the linear component data that are calculated for each of a plurality of regions divided in the main-scan direction,
wherein the correcting unit corrects the test pattern data and image data based on a sum value of the linear component data and non-linear component data stored in the storage unit for each of the plurality of regions.

8. The image forming apparatus according to claim 1, wherein the updating unit does not update the color displacement amount when at least one of components of the amount of change of the color displacement amount determined by the updating unit is not within a predetermined range.

9. The image forming apparatus according to claim 1, wherein the color displacement amount includes at least one of components of a skew error, a main-scan-direction magnification ratio error, a main-scan-direction registration error, and a sub-scan-direction registration error.

10. The image forming apparatus according to claim 1, wherein the correcting unit corrects the test pattern data and image data by using an inverted matrix of a matrix having elements corresponding to various components of the color displacement amount.

11. The image forming apparatus according to claim 1, wherein the updating unit updates the color displacement amount by adding a currently determined amount of change of the color displacement amount to the most recent color displacement amount stored in the storage unit.

12. The image forming apparatus according to claim 1, wherein the updating unit updates the color displacement amount by summing:
   the product of the obtained amount of change of the color displacement amount and the first coefficient;
   a product of an integrated value of the obtained amount of change of the color displacement amount and a second coefficient; and
   the color displacement amount stored in the storage unit.

13. The image forming apparatus according to claim 12, wherein the first coefficient and the second coefficient are varied from one component to another of the color displacement amount.

14. An image forming method comprising:
   a correcting step of correcting test pattern data and image data generated by a generating unit, based on a color displacement amount currently stored in a storage unit;
   a forming step of forming a test pattern on an intermediate transfer body based on the test pattern data corrected in the correcting step at predetermined intervals, and forming an image on the intermediate transfer body based on the image data;
   a detecting step of detecting the test pattern formed on the intermediate transfer body; and
   an updating step of obtaining an amount of change of a color displacement amount from a detecting result of the detecting step, and adding a product of the obtained amount of change of the color displacement amount and a first coefficient, with the color displacement amount stored in the storage unit.

15. An image forming apparatus comprising:
   a storage unit configured to store color displacement amount characteristic data including a non-linear component in a main-scan direction for color displacement correction;
   a correcting unit configured to correct input image data and test pattern data based on the color displacement amount characteristic data stored in the storage unit;
   an output image forming unit configured to form a plurality of images of different colors based on the input image data corrected by the correcting unit, and configured to form an output image by superposing the plurality of images on an intermediate transfer body or a recording medium;
   a test pattern forming unit configured to form a plurality of test patterns on the intermediate transfer body or a transport member that retains and transports the recording medium, based on the test pattern data corrected by the correcting unit,
   the plurality of test patterns being disposed in the main-scan direction;
   a plurality of detecting units configured to detect the respective plurality of test patterns formed by the test pattern forming unit; and
   an updating unit configured to obtain an amount of change of a color displacement amount from detection results of the plurality of detecting units, and add a product of the obtained amount of change of the color displacement amount and a first coefficient with the color displacement amount characteristic data stored in the storage unit.

* * * * *